(12) United States Patent
Shichino

(10) Patent No.: US 11,075,550 B2
(45) Date of Patent: Jul. 27, 2021

(54) POWER TRANSMISSION APPARATUS, POWER RECEIVING APPARATUS, WIRELESS POWER TRANSMISSION SYSTEM, AND CONTROL METHODS THEREOF

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/641,614

(22) PCT Filed: Aug. 20, 2018

(86) PCT No.: PCT/JP2018/030639
§ 371 (c)(1),
(2) Date: Feb. 24, 2020

(87) PCT Pub. No.: WO2019/044556
PCT Pub. Date: Mar. 7, 2019

(65) Prior Publication Data
US 2021/0159737 A1    May 27, 2021

(30) Foreign Application Priority Data
Aug. 28, 2017 (JP) .............................. JP2017-163671

(51) Int. Cl.
*H02J 50/80* (2016.01)
*H02J 7/00* (2006.01)
*H04W 28/18* (2009.01)
*H02J 50/12* (2016.01)

(52) U.S. Cl.
CPC .......... *H02J 50/80* (2016.02); *H02J 7/00045* (2020.01); *H02J 50/12* (2016.02); *H04W 28/18* (2013.01)

(58) Field of Classification Search
CPC ........ H02J 50/80; H02J 50/12; H02J 7/00045; H02J 7/00; H04W 28/18
See application file for complete search history.

(56) References Cited

U.S. PATENT DOCUMENTS

2016/0141886 A1   5/2016   Eguchi
2017/0185126 A1   6/2017   Trethewey

FOREIGN PATENT DOCUMENTS

| JP | 2010-104097 A | 5/2010 |
| JP | 2016-007116 A | 1/2016 |
| JP | 2017-112825 A | 6/2017 |

*Primary Examiner* — Robert L Deberadinis
(74) *Attorney, Agent, or Firm* — Canon U.S.A., Inc. I.P. Division

(57) ABSTRACT

A power transmission apparatus that transmits power wirelessly to a power receiving apparatus by using power supplied from a power supply apparatus includes a first authentication unit configured to execute device authentication with the power supply apparatus, a second authentication unit configured to execute device authentication with the power receiving apparatus, and a control unit that performs negotiation related to transmission power with the power receiving apparatus based on a result of the device authentication by the first authentication unit and a result of the device authentication by the second authentication unit.

27 Claims, 12 Drawing Sheets

[Fig. 1]
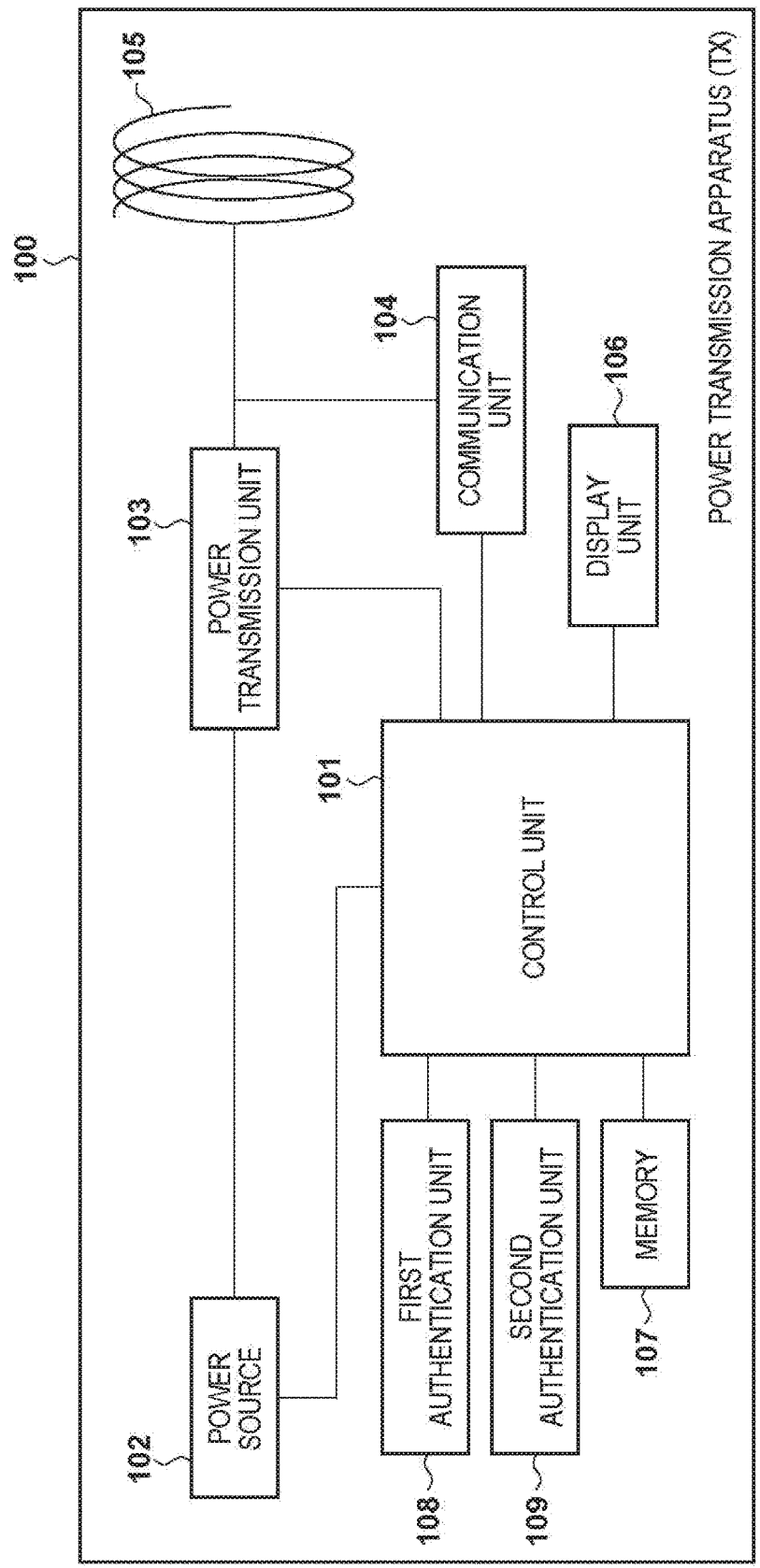

[Fig. 2]
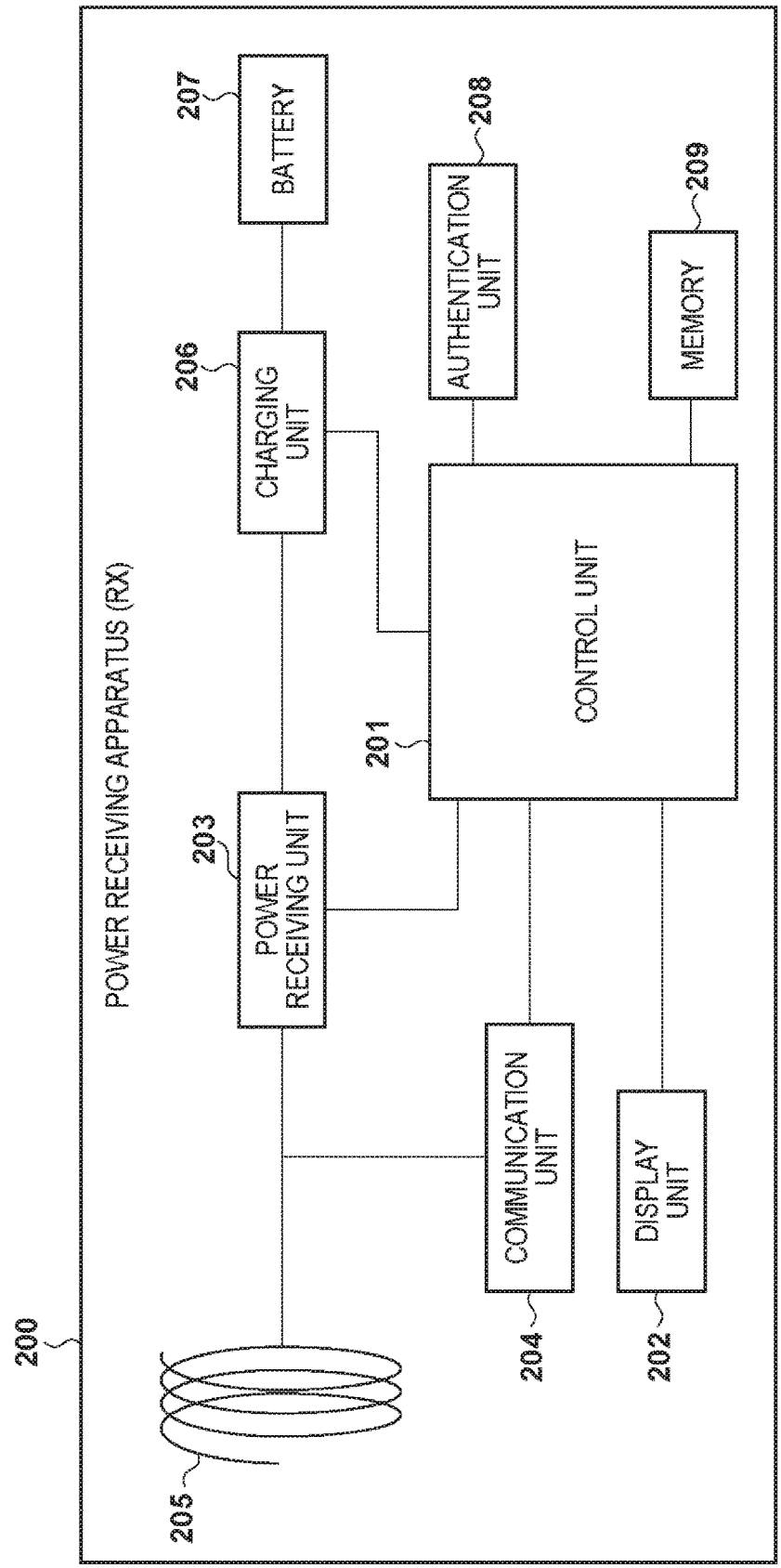

[Fig. 3]
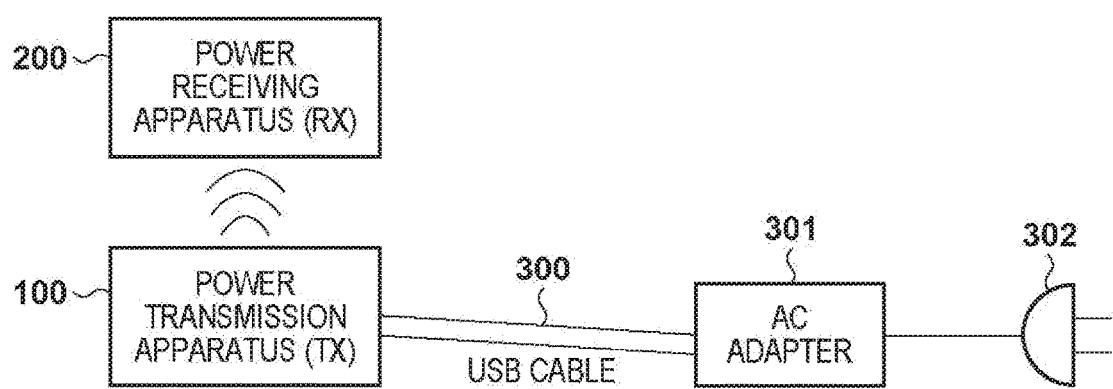

[Fig. 4]
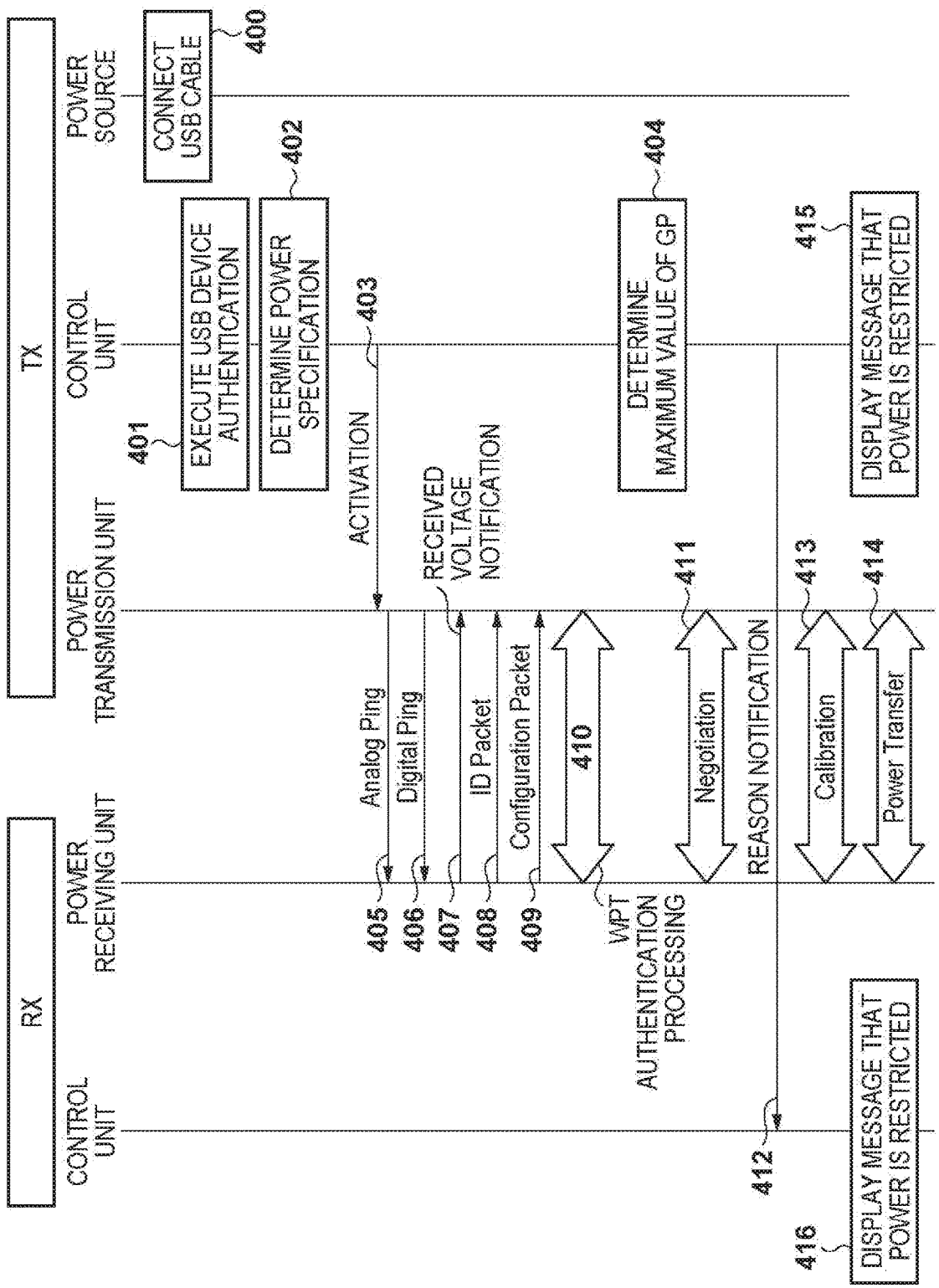

[Fig. 5]
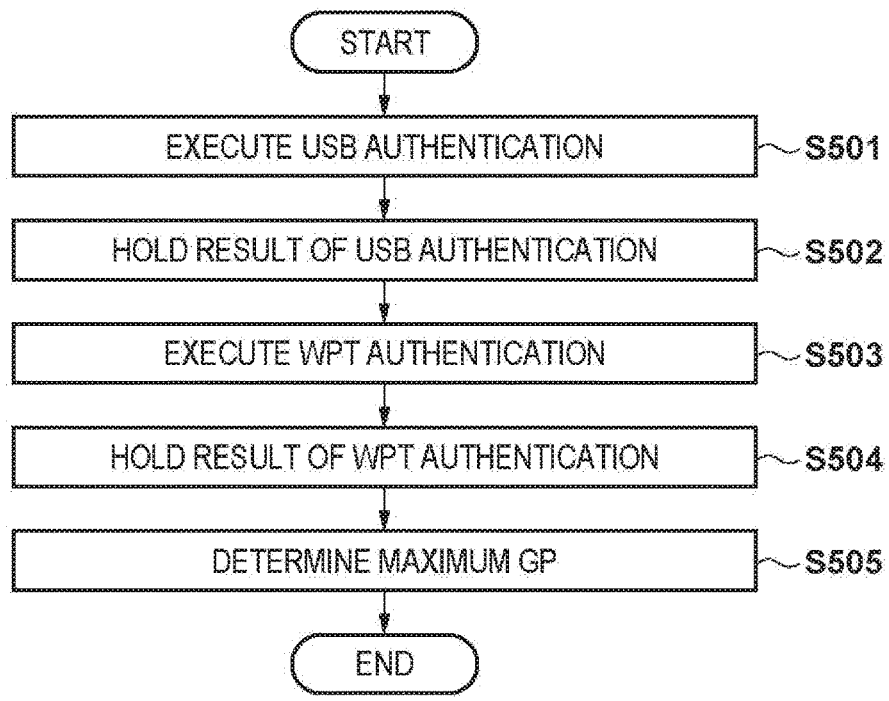
[Fig. 6]
|  | USB AUTHENTICATION NON-SUPPORT | USB AUTHENTICATION FAILURE | USB AUTHENTICATION SUCCESS |
|---|---|---|---|
| 603 — WPT AUTHENTICATION NON-SUPPORT | 5 | 0, 2.5, 5 | 5 |
| 604 — WPT AUTHENTICATION FAILURE | 0, 2.5, 5 | 0, 2.5, 5 | 0, 2.5, 5 |
| 605 — WPT AUTHENTICATION SUCCESS | 5 | 0, 2.5, 5 | 15 |

[Fig. 7]
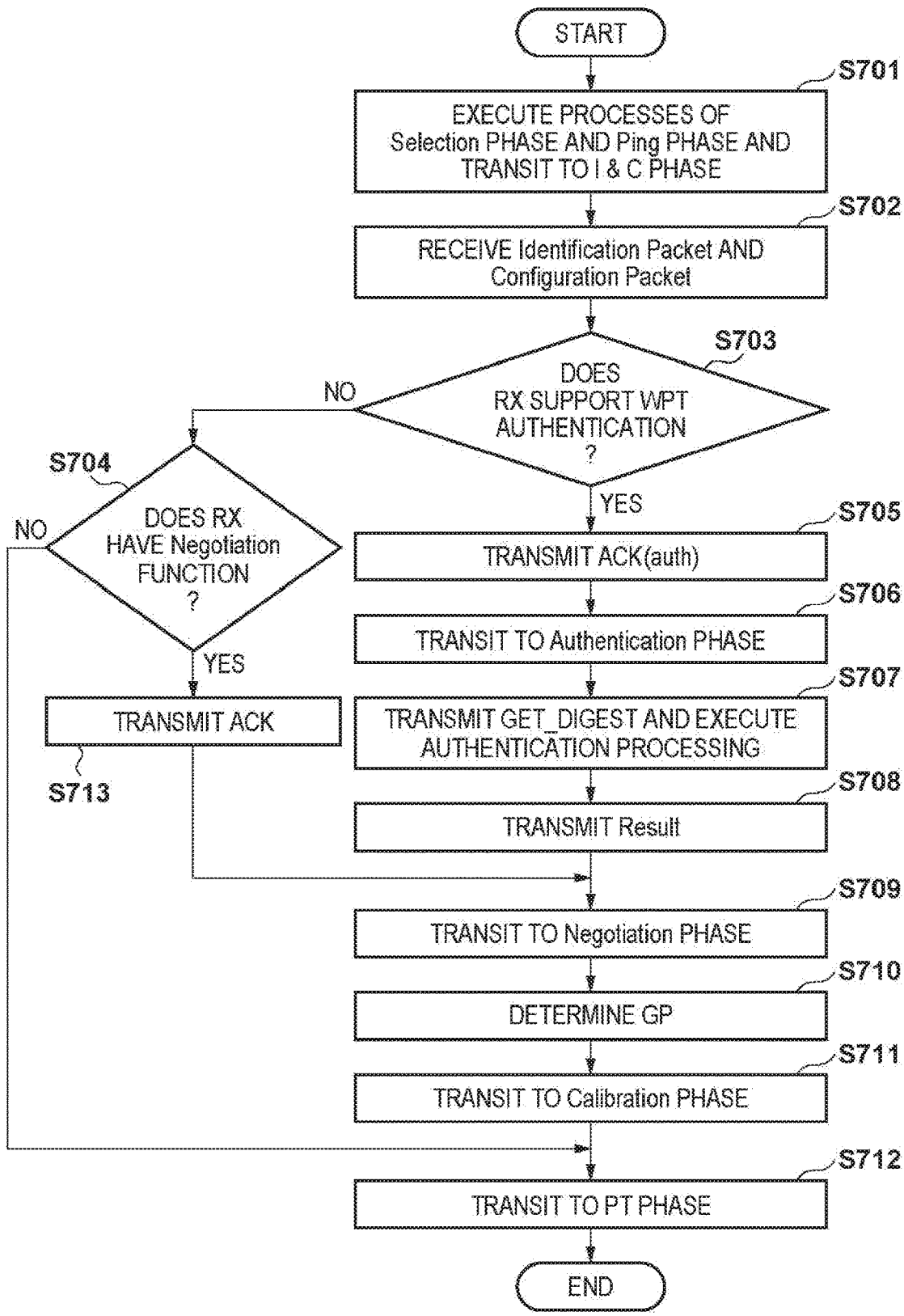

[Fig. 8A]
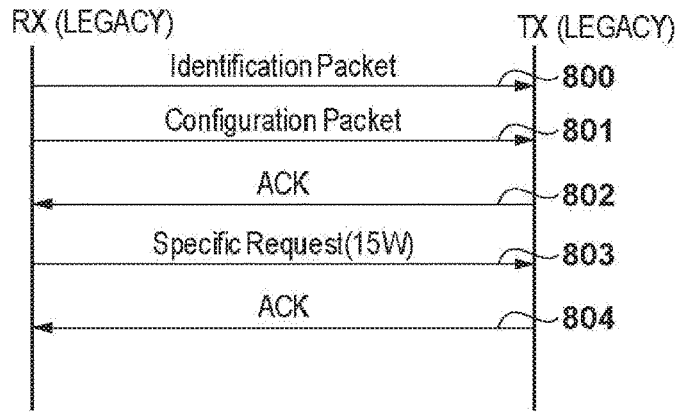
[Fig. 8B]
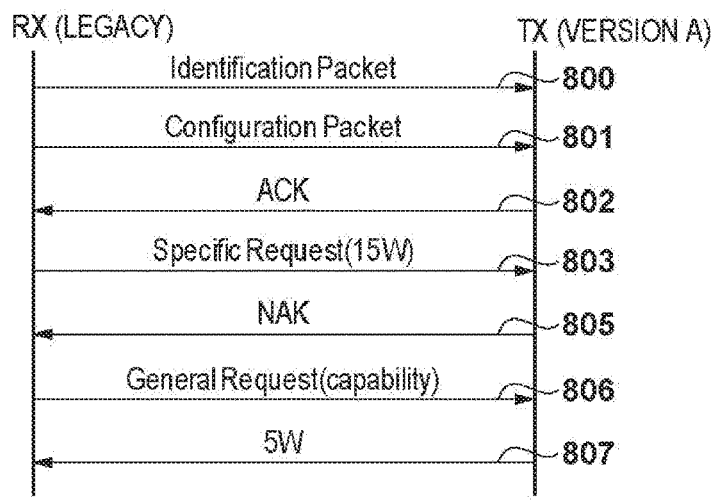
[Fig. 8C]
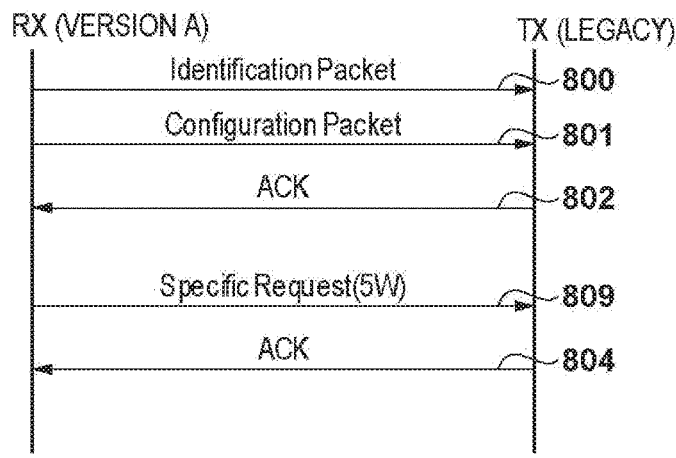

[Fig. 8D]
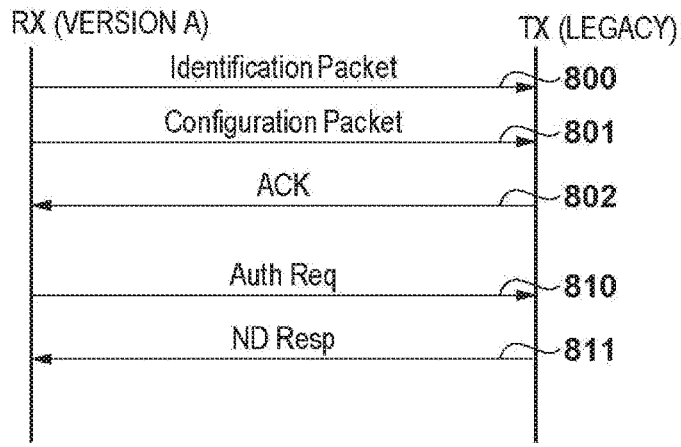
[Fig. 8E]
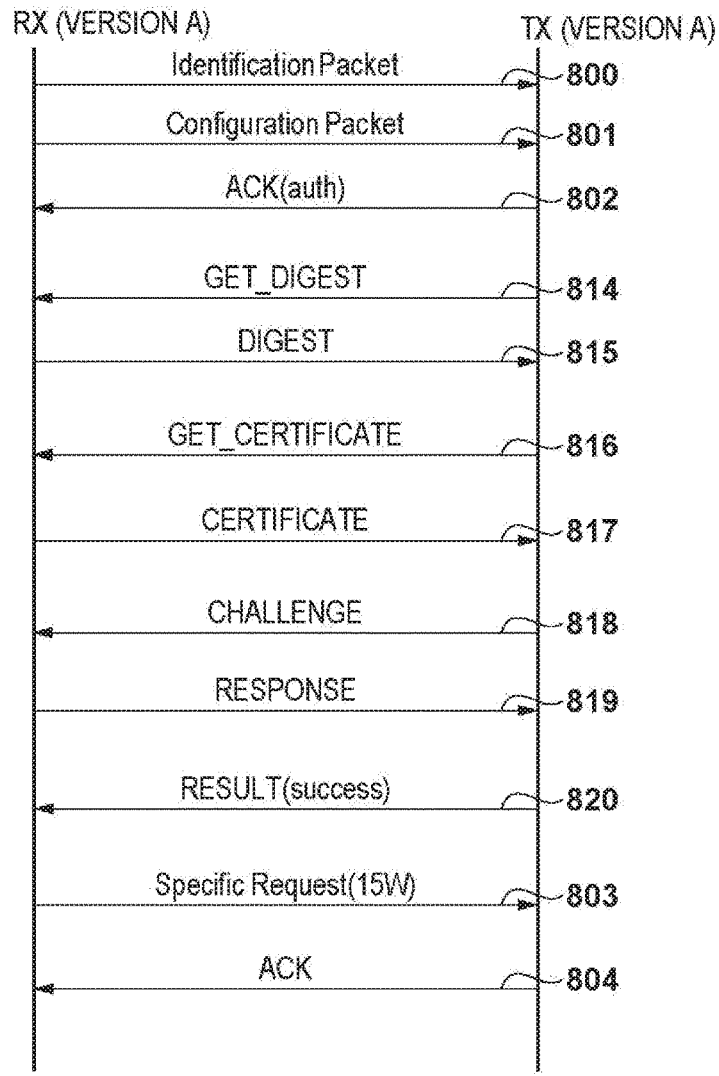

[Fig. 9A]
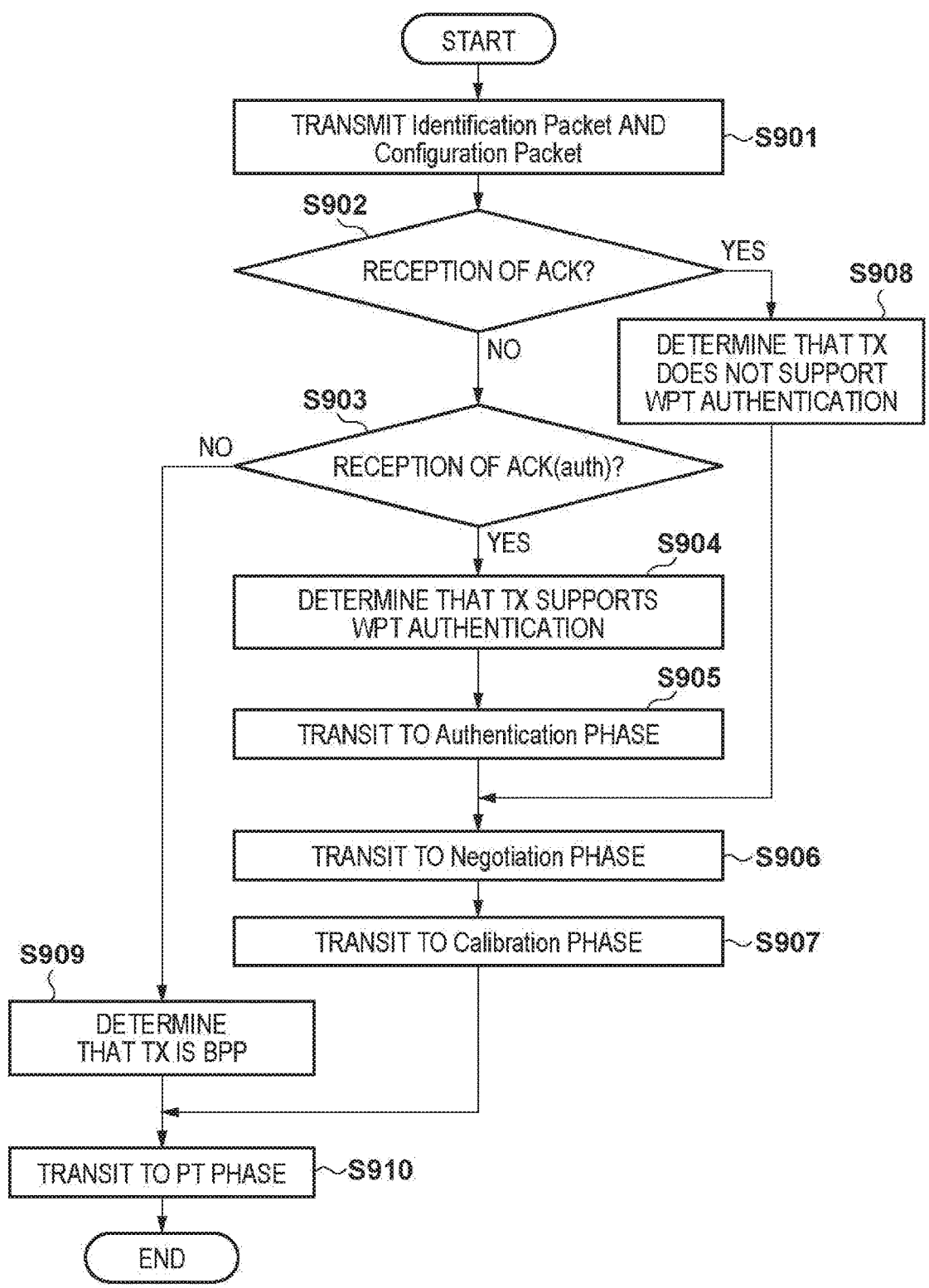

[Fig. 9B]
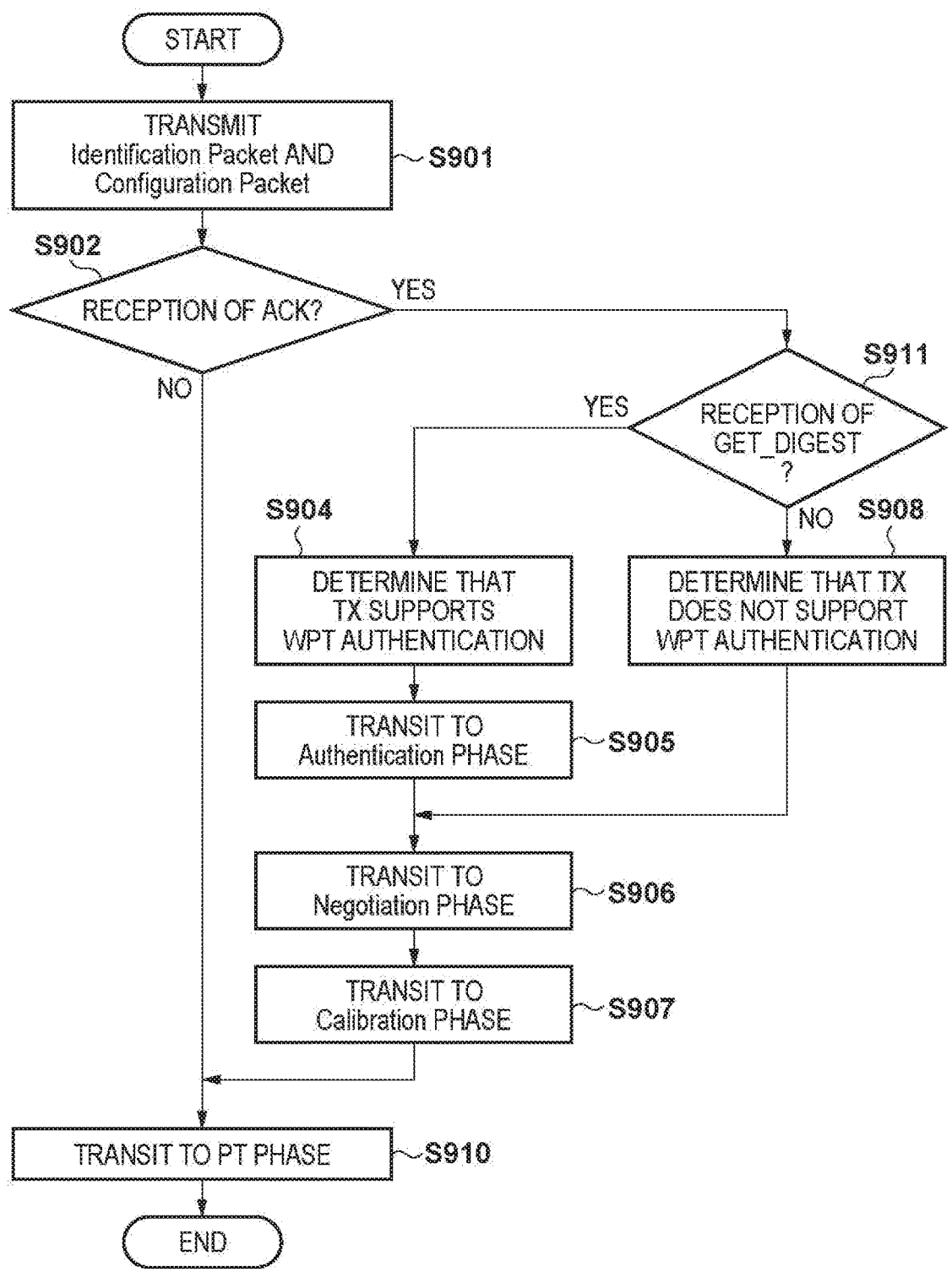

[Fig. 9C]
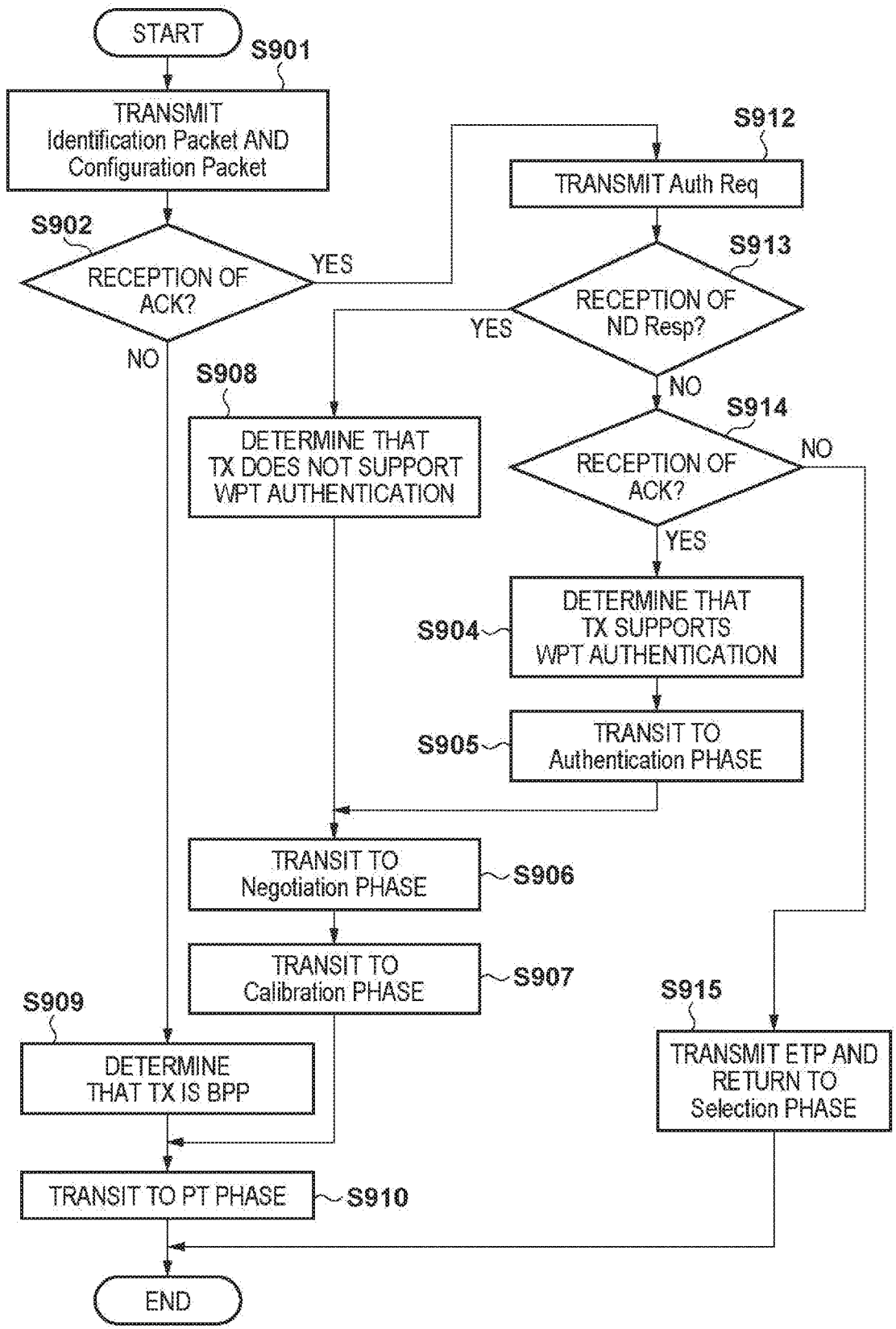

[Fig. 10A]

|       | bit7 | bit6 | bit5 | bit4 | bit3 | bit2 | bit1 | bit0 |
|-------|------|------|------|------|------|------|------|------|
| Bank0 | Power Class | | Maximum Power Value | | | | | |
| Bank1 | Reserved | | | | | | | |
| Bank2 | Prop | Reserved | | | ZERO | Count | | |
| Bank3 | Window Size | | | | Window Offset | | | |
| Bank4 | Neg | Polarity | | Depth | | Reserved | | |

|       | bit7 | bit6 | bit5 | bit4 | bit3 | bit2 | bit1 | bit0 |
|-------|------|------|------|------|------|------|------|------|
| Bank0 | Power Class | | Guaranteed Power Value | | | | | |
| Bank1 | Reserved | | Potential Power Value | | | | | |
| Bank2 | Reserved | | | | | | WPID | Not Res Sens |

1100
1101

POWER TRANSMISSION APPARATUS, POWER RECEIVING APPARATUS, WIRELESS POWER TRANSMISSION SYSTEM, AND CONTROL METHODS THEREOF

TECHNICAL FIELD

The present invention relates to a wireless power transmission system.

BACKGROUND ART

In recent years, wireless power transmission techniques are being widely developed. Japanese Patent Laid-Open No. 2016-007116 discloses a power transmission apparatus and power receiving apparatus complying with a specification (WPC specification) defined by the Wireless Power Consortium, a standards organization for contactless charging specifications. Japanese Patent Laid-Open No, 2010-104097 also discloses a device authentication method for contactless charging between a power transmission apparatus and a power receiving apparatus. According to Japanese Patent Laid-Open No. 2010-104097, the power transmission apparatus transmits challenge data to the power receiving apparatus via a power transmission coil, and the power receiving apparatus transmits response data, which is generated by performing authentication calculation on the challenge data, to the power transmission apparatus via a power receiving coil. The power transmission apparatus executes a device authentication protocol by collating the response data received from the power receiving apparatus.

In a power transmission apparatus, there is known an arrangement of receiving power from an external power supply (for example, an AC adapter) via a cable (for example, a USB cable) for the wireless transmission of the power to a power receiving apparatus. If these external power supply apparatuses such as the AC adapter and the cable are not valid devices, excessive power can be supplied to the power transmission apparatus and the power receiving apparatus. Hence, it is desirable to perform device authentication on the AC adapter and the cable as well to confirm their validity and to perform wireless power transmission by power corresponding to the validity authenticated by the device authentication.

Also, for example, in a case in which higher power is to be transmitted due to an update of a specification such as the WPC specification, a new device authentication process may be adopted to authenticate the validity of a device. In this case, it is desirable to maintain the compatibility with apparatuses supporting an earlier specification which was used before the adoption of the new device authentication. Furthermore, it is desirable to execute wireless power transmission by using higher power in a case in which wireless power transmission is to be performed between apparatuses whose validity have been proven by the device authentication, and to execute wireless power transmission by using power that can be supplied by the old version even in a case in which apparatuses cannot undergo device authentication by the old version.

SUMMARY OF INVENTION

An embodiment according the present invention provides a power transmission apparatus, a power receiving apparatus, a wireless power transmission system, and control methods thereof that can advantageously use an authentication result or a result of determining whether device authentication is executable in a wireless power transmission operation in which device authentication for authenticating the validity of a device can be executed.

According to one aspect of the present invention there is provided a power transmission apparatus that transmits power wirelessly to a power receiving apparatus by using power supplied from a power supply apparatus, comprising: first authentication means for executing device authentication with the power supply apparatus; second authentication means for executing device authentication with the power receiving apparatus; and negotiation means for performing negotiation related to transmission power with the power receiving apparatus based on a result of the device authentication by the first authentication means and a result of the device authentication by the second authentication means.

According to another aspect of the present invention there is provided a power receiving apparatus that receives power wirelessly transmitted from a power transmission apparatus, comprising: authentication means for executing device authentication with the power transmission apparatus; notification means for notifying the power transmission apparatus that the power receiving apparatus has a function for executing a device authentication to the power transmission apparatus; determination means for determining, based on a response from the power transmission apparatus to the notification by the notification means, whether the power transmission apparatus supports the device authentication; execution means for executing the device authentication by the authentication means if it is determined by the determination means that the power transmission apparatus supports the device authentication; and power receiving means for receiving power transmitted from the power transmission apparatus for supplying power corresponding to one of a result of the determination by the determination means and a result of the device authentication by the execution means.

According to another aspect of the present invention there is provided a wireless power transmission system comprising: a power supply apparatus; a power transmission apparatus configured to transmit power wirelessly by using power supplied, from the power supply apparatus; a power receiving apparatus configured to receive power wirelessly transmitted from the power transmission apparatus; first authentication means for causing the power transmission apparatus to execute device authentication with the power supply apparatus; second authentication means for causing the power transmission apparatus to execute device authentication with the power receiving apparatus; and negotiation means for causing the power transmission apparatus and the power receiving apparatus to perform negotiation related to transmission power based on a result of the device authentication by the first authentication means and a result of the device authentication by the second authentication means.

According to another aspect of the present invention there is provided a method of controlling a power transmission apparatus that transmits power wirelessly to a power receiving apparatus by using power supplied from a power supply apparatus, the method comprising: executing device authentication with the power supply apparatus; executing device authentication with the power receiving apparatus; and performing negotiation related to transmission power with the power receiving apparatus based on a result obtained in the executing the device authentication with the power supply apparatus and a result obtained in the executing the device authentication with the power receiving apparatus.

According to another aspect the present invention there is provided a method of controlling a power receiving apparatus that receives power transmitted wirelessly from a power transmission apparatus, the method comprising: executing device authentication with the power transmission apparatus; notifying the power transmission apparatus that the power receiving apparatus has a function for executing a device authentication to the power transmission apparatus; determining, based on a response from the power transmission apparatus to a notification in the notifying, whether the power transmission apparatus supports the device authentication; and executing device authentication in the executing if it is determined in the determining that the power transmission apparatus supports the device authentication.

According to another aspect of the present invention there is provided a method of controlling a wireless power transmission system comprising a power supply apparatus, a power transmission apparatus configured to transmit power wirelessly by using power supplied from the power supply apparatus, and a power receiving apparatus configured to receive power wirelessly transmitted from the power transmission apparatus, the method comprising: causing the power transmission apparatus to execute device authentication with the power supply apparatus, causing the power transmission apparatus to execute device authentication with the power receiving apparatus, and causing the power transmission apparatus and the power receiving apparatus to perform negotiation related to transmission power based on a result obtained in the causing the power transmission apparatus to execute the device authentication with the power supply apparatus and a result obtained in the causing the power transmission apparatus to execute the device authentication with the power receiving apparatus.

Further features of the present invention will become apparent from the following description of exemplary embodiments (with reference to the attached drawings).

BRIEF DESCRIPTION OF DRAWINGS

FIG. 1 is a block diagram showing an example of the arrangement of a power transmission apparatus according to an embodiment, FIG. 2 is a block diagram showing an example of the arrangement of a power receiving apparatus according to the embodiment.

FIG. 3 is a block diagram showing an example of the arrangement of a contactless charging system according to the embodiment.

FIG. 4 is an operation sequence chart of the contactless charging system including USB authentication and WPT authentication.

FIG. 5 is a flowchart showing GP setting processing by a control unit of the power transmission apparatus.

FIG. 6 is a table showing the relationship between device authentication results and GP setting values.

FIG. 7 is a flowchart showing the transition of states until power transmission by the control unit of the power transmission apparatus.

FIG. 8A is a sequence chart related to communication between the power transmission apparatus and the power receiving apparatus.

FIG. 8B is a sequence chart related to communication between the power transmission apparatus and the power receiving apparatus.

FIG. 8C is a sequence chart related to communication between the power transmission apparatus and the power receiving apparatus.

FIG. 8D is a sequence chart related to communication between the power transmission apparatus and the power receiving apparatus.

FIG. 8E is a sequence chart related to communication between the power transmission apparatus and the power receiving apparatus.

FIG. 9A is a flowchart showing the transition of states until power transmission by a control unit of the power receiving apparatus.

FIG. 9B is a flowchart showing the transition of states until power transmission by the control unit of the power receiving apparatus.

FIG. 9C is a flowchart showing the transition of states until power transmission by the control unit of the power receiving apparatus.

FIG. 10A is a view showing the arrangement of a configuration packet.

FIG. 10B is a view showing the arrangement of a power transmitter capability packet.

DESCRIPTION OF EMBODIMENTS

An embodiment of the present invention will be described hereinafter with reference to the accompanying drawings. In the embodiment to be described hereinafter, device authentication that also confirms the validity of an AC adapter and a cable which are to serve as power supply apparatuses for a power transmission apparatus in addition to validity of the power apparatus will be described, in addition, the following embodiment will describe a mechanism for performing wireless power transmission while ensuring safety even in a case in which device authentication is not supported by the AC adapter and the cable which are to serve as the power supply apparatuses for the power transmission apparatus. Furthermore, there will be described a control method for device authentication with a power supply and for suitable wireless power transmission between the power transmission apparatus and the power receiving apparatus via the power transmission coil and the power receiving coil by using a plurality of types of device authentication protocols of device authentication.

FIG. 3 is a block diagram showing an example of the arrangement of a contactless charging system as a wireless power transmission system according to the embodiment. In FIG. 3, a power transmission apparatus (to be referred to as a TX 100 hereinafter) wirelessly transmits power, which is supplied from an AC adapter 301 via a USB cable 300, to a power receiving apparatus (to be referred to as an RX 200). The RX 200 receives the power transmitted wirelessly from the TX 100 and charges, for example, a battery. The AC adapter 301 supplies power to the TX 100 by converting power from a commercial power supply supplied via a power plug 302 into a voltage suitable for TX 100.

FIG. 1 is a block diagram showing an example of the arrangement of the power transmission apparatus (TX 100) applicable to the contactless charging system shown in FIG. 3. The TX 100 is in compliance with the WPC specification and has functions described in the WPC specification v1.2.2. Assume that the TX 100 according to this embodiment has the capability to supply power that is enough to output power up to a maximum of 15 W to a charging unit of the power receiving apparatus (RX 200) which is also in compliance with the WPC specification. Note that the TX 100 and the RX 200 will be described as apparatuses which are in compliance with the WPC specification. However, the present invention is not limited to this, and other contactless charging specifications may be used.

A control unit 101 controls the overall TX 100. An example of the control unit 101 is a central processing unit (CPU). A power source 102 is in compliance with the USB Power-Delivery specification and is also in compliance with the USB authentication specification by which device authentication between connected USB devices is performed. The power source 102 receives operational power for the TX 100 from the AC adapter 301 via the USB cable 300 and supplies the power to cause at least the control unit 101 and a power transmission unit 103 to operate. The power transmission unit 103 generates an AC voltage and an AC current to be transmitted to the power receiving apparatus (RX 200) via a power transmission coil 105. More specifically, the power transmission unit converts the DC voltage supplied by the power source 102 into the AC voltage by a switching circuit that has a half-bridge or full-bridge configuration using an FET. The power transmission unit 103 includes a gate driver that controls the ON/OFF of the FET.

A communication unit 104 executes wireless power transmission control communication with the RX 200 (a communication unit 204 in FIG. 2) based on the WPC specification. In this embodiment, assume that communication executed by the communication unit 104 is so-called inbound communication in which communication is superimposed on wireless power by modulating the AC voltage or current generated by the power transmission unit 103. However, the present invention is not limited to this, and the communication unit may execute outbound communication which uses a frequency different from the frequency of the power transmission unit 103. For example, NFC, RFID, Wi-Fi (IEEE802.11 series), Bluetooth™, or the like may be employed for the outbound communication. A display unit 106 displays and notifies a user of the state of the TX 100 itself or the state of the contactless charging system including devices such as the TX 100, the RX 200, the USB cable 300, the AC adapter 301, and the like as shown in FIG. 3. In this embodiment, the display unit 106 is described as an LED. However, the display unit may have another arrangement as long as it can notify the user of the aforementioned state, and may be a loudspeaker, a vibration generating circuit, or a display.

A memory 107 stores the overall state and the state of each component of the TX 1.00 and the contactless charging system (FIG. 3). A first authentication unit 108 performs device authentication of the power source 102 and the USB cable 300 and the AC adapter 301 which are connected to the power source 102. In this embodiment, the first authentication unit 108 is described as a unit that is in compliance with the USB authentication specification. However, the first authentication unit may be in compliance with another specification that supports device authentication, may be the Quick Charge specification by Qualcomm, or may be in compliance with a specification other than these. A second authentication unit 109 performs device authentication between the TX 100 and the RX 200 by communication via the communication unit 104. The device authentication performed by the second authentication unit 109 will be called Wireless Power Transfer authentication (WPT authentication) in this embodiment.

Although the control unit 101, the power source 102, the power transmission unit 103, the communication unit 104, the memory 107, the first authentication unit 108, and the second authentication unit 109 are described as separate components in FIG. 1, an arbitrary plurality of these components may be incorporated in a single chip. For example, the power source 102 complying with the Power Delivery specification and the first authentication unit 108 complying with the USB authentication specification may be incorporated in a single chip as a USB-related chip. In this case, the control unit 101 and the USB-related chip may be connected by, for example, general purpose input/output (GPIO) or serial communication.

FIG. 2 is a block diagram showing an example of the arrangement of the power receiving apparatus (RX 200) according to this embodiment. The RX 200 is in compliance with a specification defined by WPC and has a function described in the WPC specification v11.2.2.

In the RX 200, a control unit 201 controls the overall RX 200. An example of the control unit 201 is a CPU. A power receiving unit 203 converts the AC voltage and the AC current, which are received from the power transmission coil 105 via a power receiving coil 205, into the DC voltage and the DC current used for operating the control unit 201 and a charging unit 206. Assume that the power receiving unit 203 according to this embodiment has the capability to output power up to a maximum of 15 W to the charging unit 206.

The communication unit 204 executes contactless charging control communication with the communication unit 104 of the TX 100 based on the WPC specification. This control communication is so-called inbound communication of executing load modulation on electromagnetic waves received via the power receiving coil 205. However, the present invention is not limited to this, and the communication unit may perform outbound communication by using a frequency different form the frequency of the power transmission unit 103. NFC, RFID, Wi-Fi (IEEE802.11 series), Bluetooth™, or the like may be employed for the outbound communication.

The charging unit 206 charges a battery 207 by using the DC voltage and the DC current supplied from the power receiving unit 203. An authentication unit 208 performs WPT authentication between the TX 100 (second authentication unit 109) and the RX 200 by communication via the communication unit 204. A memory 209 stores the overall state and the state of each component of the RX 200 and the contactless charging system (FIG. 3). Note that a state in which the TX 100 or the RX 200 is in compliance with the WPC specification including the WPT authentication will be expressed hereinafter as a state in compliance with the WPC specification version A. Here, assume that the WPC specification version A is a specification succeeding the WPC specification v1.2.2, and at least a WPT authentication function has been added to this WPC specification version A.

A display unit 202 displays the power supply state, the charging state, and the like. In this embodiment, the display unit 202 will be described as an LED. However, the display unit may have another arrangement as long as it can notify the user of the aforementioned states, and may be, for example, a loudspeaker, a vibration generation circuit, or a display. Note that although the power receiving unit 203, the authentication unit 208, the control unit 201, the memory 209, the communication unit 204, and the charging unit 206 are described as separate components in FIG. 2, an arbitrary plurality of these components may be incorporated in a single chip.

The first authentication unit 108 of the TX 100 performs, in the contactless charging system according to this embodiment which includes the above-described arrangement, device authentication by using the AC adapter 301, the USB cable 300, and a first communication protocol (for example, USB authentication via the USB cable). The second authentication unit 109 of the TX 100 performs device authentication with the RX 200 by using a second communication protocol that uses different media (for example, the power transmission coil 105 and the power receiving coil 205) from the media used by the first communication protocol for communication.

The AC adapter 301, the USB cable 300, and the TX 100 (power source 102) are USB devices in the contactless charging system according to the embodiment shown in FIG. 3. A state in which the USB devices support USB authentication and succeed in USB authentication indicates that these devices have no risks such as overheating and the like when power predetermined by the USB authentication is applied. That is, when USB authentication is successful, the power source 102 of the TX 100, the USB cable 300, and the AC adapter 301 will not overheat even if predetermined power is supplied from the AC adapter 301 to the power source 102 of the TX 100 via the USB cable 300.

If one of the power source 102 of the TX 100, the USB cable 300, and the AC adapter 3011, which form the power supply path to the power transmission unit 103 of the TX 100, does not support USB authentication, USB authentication will not be successful, as a matter of course. In this case, when the predetermined power is applied, there are risks such as overheating and the like for the device that does not support the USB authentication. A state in which a device does not support the USB authentication described here includes a state in which the device is in compliance with one of the plurality of previous versions of USB specifications set before the current USB authentication specification was defined. In this embodiment, assume that a UBS device in compliance with one of the plurality of previous versions of USB specifications set before the USB authentication specification was defined will be called a legacy USB device.

If USB authentication fails in one of the power source 102 of the TX 100, the USB cable 300, and the AC adapter 301, since this is also a case in which USB authentication is unsuccessful, the aforementioned risks are present when the aforementioned predetermined power is applied. Here, a state in which the USB authentication fails includes a state in which there is a possibility that one or both of the USB cable 300 and the AC adapter 301 may be malicious USB devices that may seem to support USB authentication but actually do not support the USB authentication.

A case in which the RX 200 and the TX 100 are in compliance with the WPC specification version A and succeed in WPT authentication represents that there are no risks such as overheating and the like even if the RX 200 and the TX 100 exchange predetermined power. On the other hand, WPT authentication does not succeed when one or both of the RX 200 and the TX 100 are not in compliance with the WPC specification version A. In this case, if the aforementioned predetermined power is supplied, each apparatus that is not in compliance with the WPC specification version A carries risks such as overheating and the like. Here, a state in which an apparatus is not in compliance with the WPC specification version A includes a state in which the apparatus is in compliance with one of the plurality of previous versions of the WPC specifications set before the WPC specification version A. In this embodiment, assume that a TX or an RX in compliance with one of the plurality of previous versions of WPC specifications set before the WPC specification version A will be called a legacy TX or a legacy RX.

If the WPT authentication fails for the TX 100 and the RX 200, there is a possibility that the TX or the RX may be a malicious TX or RX which may seem to be in compliance with WPT authentication but is actually not in compliance with the WPT authentication (because authentication is always successful if the apparatus supports the WPT authentication). In this case, since the WPT authentication is unsuccessful, there are risks such as overheating and the like when the aforementioned predetermined power is applied.

In this embodiment, it is determined that predetermined power can be supplied safely when the USB authentication of the USB cable 300 and the AC adapter 301 is successful and the WPT authentication of the RX 200 and the TX 100 is successful. That is, even if the power receiving unit 203 of the RX 200 supplies the predetermined power (15 W) to a load. (the charging unit 206 in this embodiment), there will be no risks such as overheating and the like. On the other hand, there is a possibility that the predetermined power cannot be supplied safely when the USB authentication of one of the TX 100 (power source 102), the USB cable 300, and the AC adapter 301 is unsuccessful or when the WPT authentication of either the RX 200 or the TX 100 is unsuccessful. That is, if the power receiving unit 203 of the RX 200 supplies the predetermined power of 15 W to the load, there will be risks such as overheating and the like. Assume that the power supplied by the power receiving unit 203 is restricted to power (for example, 5 W or less) lower than the predetermined power (for example, 15 W) when authentication is unsuccessful to avoid these risks hereinafter.

In the related arts, however, a control method considering this plurality of authentication methods in a system where a plurality of device authentication protocols such as the USB authentication and the WPT authentication are present as described above has not been proposed.

FIG. 4 is a sequence chart which includes the USB authentication and the WPT authentication according to this embodiment. FIG. 5 is a flowchart showing an operation of the control unit 101 of the power transmission apparatus (TX 100) related to a guaranteed power (to be referred to as GP hereinafter) setting according to this embodiment. GP represents a power value which is guaranteed for the output power to the load of the power receiving unit 203 even if the positional relationship of the TX 100 and the RX 200 is shifted and the power transmission efficiency between the power transmission coil 105 and the power receiving coil 205 is reduced. The load of the power receiving unit 203 is the power supply subject of the power receiving unit 203 and includes at least the charging unit 206. For example, if the GP is 5 W, the TX 100 controls the power transmission unit 103 so that the power receiving unit 203 can output a power of 5 W even if the power transmission efficiency between the coils has been reduced by the shifting of the positional relationship between the power transmission coil and the power reception coils. The operation (GP determination operation) shown in FIGS. 4 and 5 will be described later in the explanation of FIG. 6.

FIG. 6 is a table showing an example of each GP restriction value which is used in a negotiation (to be described later) in accordance with the result of the USB authentication and the WPT authentication.

The "USB authentication non-support" of a column 600 indicates a state in which at least one of the power source 102 of the TX 100, the USB cable 300, and the AC adapter 301 does not support USB authentication (however, authentication has been successful in each device supporting the USB authentication). The "USB authentication failure" of a column 601 indicates a state in which the USB authentication has failed for one of the power source 102 of the TX 100, the USB cable 300, and the AC adapter 301 despite the fact that USB authentication is supported by the device. The "USB authentication success" of a column 602 indicates a state in which the USB authentication has been successful for each of the power source 102 of the TX 100, the USB cable 300, and the AC adapter 301. A row 603 indicates a state in which the RX 200 does not support the WPT authentication, a row 604 indicates a state in which the WPT authentication has failed for the RX 200 despite supporting WPT authentication, and a row 605 indicates a state in which the WPT authentication has been successful in the RX 200 which supports the WPT authentication. Note that when three types of GP voltage values, "0, 2.5, 5" are written in a field in the table, it will be predetermined so that one of the values will be employed.

According to FIG. 6, in the case of a USB authentication non-support state (column 600), power transmission which avoids risks such as overheating can be executed, regardless of the result of the WPT authentication, by restricting the OP to 5 W. In the case of a WPT authentication failure state (row 604) of the column 600, the OP may be restricted to a value which is smaller than the case of a WPT authentication nonsupport state (row 603) such as 0 W (no power transmission) or 2.5 W (lower than 5 W). This is because the failure of WPT authentication indicates that the RX may be a malicious RX (for example, a fake apparatus not satisfying the WPC specification) that supports WPT authentication but does not accurately support the WPT authentication. Although it suffices to restrict the GP to 5 W from the viewpoint of the above-described risks such as overheating and the like, restricting the OP to OP (0 W or 2.5 W) that is lower than the OP of the legacy RX, which does not support the WPT authentication but is accurately in compliance with the specification, has the merit of eliminating a fake apparatus.

In the same manner, in the case of a USB authentication failure state (column 601), the OP may be restricted to a value which is smaller than the case of the USB authentication non-support state (column 600) such as 0 W (no power transmission) or 2.5 W (lower than 5 W). This is because the failure of USB authentication indicates that the USB device may be a malicious USB device that supports the USB authentication but does not accurately support the USB authentication. Hence, restricting the OP to 0 W or 2.5 W which is lower than the GP of the legacy USB which does not support the USB authentication but is accurately in compliance with the specification has the merit of eliminating a fake apparatus.

Also the case of a USB authentication success state (column 602) indicates that there are no above-described risks for the power source 102 of the TX 100, the USB cable 300, and AC adapter 301 related to the USB in the system of FIG. 3 even if the RX 200 supplies power of 15 W to the load. Hence, the TX 100 sets the OP based on the result of the WPT authentication. In the case of the WPT authentication non-support state (row 603), the GP is set to 5 W based on the above-described reasons, and in the case of the WPT authentication failure state (row 604), the GP is restricted to a lower CUP value (0 W or 2.5 W). In the case in which the USB authentication is successful (column 602) and the WPT authentication is also successful (row 605), it is determined that there are no above-described risks, and the TX 100 sets 15 W, which is the maximum value of capability of each of the TX 100 and the RX 200, as the GP restriction value. In this manner, when all of the device authentication operations of the USB authentication and the WPT authentication are successful, power transmission by the maximum capability of the TX 100 and the RX 200 is determined in the negotiation performed in a negotiation phase (to be described later).

<Sequence from Activation to Power Transmission in Contactless Charging System>

The sequence from the activation to power transmission in the contactless charging system shown in FIG. 3 will be described by using FIGS. 4 and 5. The TX 100 operates, in the USB authentication and the WET authentication, so as to restrict the transmission power if there is at least one device that does not support the authentication operations or whose authentication has failed among the authentication subject devices.

When the USB cable 300 and the AC adapter 301 are connected to the power source 102 of the TX 100 (400), the control unit 101 of the TX 100 performs USB authentication (401, step S501). In the USB authentication, the control unit 101 causes the first authentication unit 108 to operate and determines whether USB authentication is supported by all of the authentication-subject USB devices (both the USB cable 300 and the AC adapter 301 in the embodiment). The first authentication unit 108 executes the USB authentication for all of the USB devices and determines "USB authentication success" when all of the executed USB authentication operations are successful. Also, in this embodiment, "USB authentication non-support" and "USB authentication failure" have been set as authentication results for cases in which the USB authentication for all of the USB devices have failed. If there is even one device which supports USB authentication but has failed to be authenticated, "USB authentication failure" is determined. When all of the devices in which authentication has not been successful are devices which do not support the USB authentication, "USB authentication non-support" is determined.

For example, in a case in which the USB authentication of the AC adapter 301 is successful but the USB cable 300 does not support the USB authentication, "USB authentication non-support" is determined. Also, for example, in a case in which the USB authentication of the AC adapter 301 is successful but the USB authentication of the USB cable 300 has failed despite the USB authentication being supported in the USB cable, "USB authentication failure" is determined. Additionally, for example, the USB authentication of both the AC adapter 301 and the USB cable 300 is successful, "USB authentication success" is determined. The control unit 101 holds these USB authentication results in the memory 107 (step S502).

Next, the control unit 101 determines, with respect to the AC adapter 301, the power specification of the voltage and the current supplied from the AC adapter 301 based on the sequence of USB PD (USB Power Delivery specification) (402). Since the power voltage is determined by the internal arrangement of the TX 100, a current value is determined in this case. Assume that the voltage of the power source 102 in the system of FIG. 3 is 15 V and that the output current of the power source 102 is a maximum of 3 A. Here, to decrease the current value, the control unit 101 of the TX 100 executes a determination operation as shown in FIG. 6. For example, in the case of "USB authentication non-support", 5 W is determined as the maximum GP value by the negotiation in the negotiation phase (to be described later) of the WPC specification based on the column 600 of FIG. 6.

The control unit 101 determines the current value in consideration of loss inside the TX 100. For example, assume that the positions of the power transmission coil and the power receiving coil have changed and that the system efficiency is 50% when 5 W, which is the GP when efficiency between the coils is at its lowest, is output to the RX 200. In this case, the power supplied by the power source 102 to the power transmission unit 103 and the control unit 101 is 10 W (5 W×2). Since the power voltage is 115 V, the output current is 0.67 A. In this embodiment, in a case in which one of the USB devices does not support the USB authentication, it suffices to restrict the GP to 5 W in order to avoid the risks. Hence, the current value which is to be determined by the power source 102 by negotiating with the AC adapter 301 based on the sequence of the USB PD suffices to be about 0.67 A. Based on this current value to be determined, the control unit 101 of the TX 100 determines the power specification with the AC adapter 301. On the other hand, in a case in which the USB authentication is successful, the power specification is determined to be 2.0 A (15 W×2/15 V) so that a GP value of 15 W can be supported.

The control unit 101 of the TX 100 activates the power transmission unit 103 (403).

Activation of the power transmission unit 103 may be executed by the so-called power-only setting of inputting power from the power source 102 to at least one of the control unit 101, the power transmission unit 103, and the communication unit 104. Alternatively, the first authentication unit 108 may reset at least one of the control unit 101, the power transmission unit 103, and the communication unit 104 by inputting a reset signal (LO: approximately 0 V) (not shown) to at least one of the control unit 101, the power transmission unit 103, and the communication unit 104 of the TX 100. In this case, the first authentication unit 108 cancels the reset by changing the reset signal to HI (for example, 3.3 V) after the power specification is determined and the GP value has been determined.

When the power transmission unit 103 is activated, the TX 100 starts an operation in compliance with the WPC specification. In this embodiment, in addition to each phase in compliance with the WPC specification, an authentication phase is defined as a phase to perform WPT authentication. In the authentication phase, the TX and the RX perform device authentication operations based on the WPT authentication. If both the TX and the RX support the authentication phase, the TX and the RX undergo state transition in the order of a selection phase, a ping phase, an identification & configuration phase (I & C phase), an authentication phase, a negotiation phase, a calibration phase, and a power transfer phase (PT phase).

More specifically, first in the selection phase, the power transmission unit 103 transmits an analog ping via the power transmission coil 105 (405). An analog ping is an extremely low power signal for detecting an object which is present near the power transmission coil 105. The TX 100 detects the voltage value or the current value of the power transmission coil at the transmission of the analog ping, determines that an object is present if the voltage is below a predetermined threshold or if the current value exceeds a predetermined threshold, and transits the process to the ping phase.

In the ping phase, the TX 100 transmits a digital ping with higher power than the analog ping. The digital ping has sufficient power to activate the control unit 201 of the RX 200 present near the power transmission coil 105. After being activated by the digital ping received via the power receiving coil 205, the control unit 201 of the RX 200 notifies the TX 100 of the magnitude of the received voltage (407) and transits to the I & C phase. Upon receiving the notification of the received voltage value, the TX 100 transits to the I & C phase. Next, the RX 200 transmits an ID packet and a configuration packet to the TX 100 (408, 409).

Next, the second authentication unit 109 executes the WPT authentication processing in the authentication phase (410, S503). The authentication subject is the RX 200 as the power receiving apparatus in the wireless power transmission system. The control unit 101 holds this WPT authentication result in the memory 107 (step S504). The control unit 101 determines (404, step S505) the maximum value of the GP which is to be used in the negotiation phase based on FIG. 6 and the USB authentication result held in the memory 107 in step S502 and the WPT authentication held in the memory 107 in step S504. The details of the authentication phase will be described later with reference to FIG. 8E.

Subsequently, the control unit 101 of the TX 100 determines the GP by the negotiation with the RX 200 in the negotiation phase (411). Here, a negotiation is performed so that the transmission power will be equal to or less than the GP value (404), that is, the permitted transmission power, which has been restricted based on the device authentication results by the first authentication unit 108 (USB authentication) and the second authentication unit 109 (WPT authentication). For example, if the USB authentication result is "USB authentication success" and the WPT authentication result is "WPT authentication success", the GP is permitted to be set up to 15 W as shown in FIG. 6. On the other hand, if the USB authentication result is "USB authentication non-support", the GP is restricted to 5 W or less. In this case, if the GP exceeding 5 W is requested from the control unit 201 of the RX 200 in the negotiation phase, the control unit 101 of the TX 100 transmits a NAK to the request. Otherwise, if the GP which is equal to or lower than the restriction value is requested, the control unit 101 transmits an acknowledgement (ACK).

As described above, since the control unit 101 of the TX 100 sets the OP based on the results from both the USB authentication and the WPT authentication, risks such as overheating and the like can be avoided by restricting the magnitude of the OP when one authentication of the plurality of authentication operations fails. Only in a case in which all of the authentication operations are successful, the OP can be set to the maximum value of the capability of the power transmission unit 103.

Next, the control unit 101 of the TX 100 transmits (412) a reason notification to notify the control unit 201 of the RX 200 of the reason for the restriction of the GP. The device authentication results from the first authentication unit 108 and the second authentication unit 109 are transmitted by the reason notification to the RX 200 which is the power receiving apparatus. This reason notification may be a RESULT packet (820 of FIG. 8E) which will be described later. In this embodiment, the control unit 101 of the TX 100 stores the WPT authentication result and the USB authentication result related to the power source 102 of the TX 100 in the RESULT packet and transmits the RESULT packet to the control unit 201 of the RX 200. For example, the control unit 101 sets 1 bit for storing the WPT authentication result in the RESULT packet and stores "1" if the WPT authentication is successful or stores "0" if the WPT authentication is unsuccessful. The control unit 101 sets 1 bit for storing the USB authentication results of the AC adapter 301 and the USB cable 300 in the RESULT packet and stores "1" if all of the USB authentication operations are successful or stores "0" if they are not. In this manner, the control unit 101 transmits a RESULT packet in which the device authentication results are stored.

Subsequently, the control unit 101 of the TX 100 and the control unit 201 of the RX 200 execute processing of the calibration phase (413) and transit to the PT phase. In the PT phase, the RX 200 supplies power to the load (414). The control unit 201 of the RX 200 may display (416) on the display unit 202 a message that the power is restricted based on the reason notification (412). In the same manner, the control unit 101 of the TX 100 may display (415) on the display unit 106 a message that the power is restricted based on the device authentication result (reason notification). For example, it may display a message that "executing low-speed charging since USB authentication was not successful (because of a USB device)" based on the USB authentication results and the WPT authentication result of the RESULT packet. By this display, the user can know that charging will take a longer time than when the power is not restricted and can take measures such as exchanging the USB cable or the USB adapter to a. USB-authentication supporting product and the like. The display may also refer to the WPT authentication result, and it is obvious that the same effect can be achieved. Also, in a case without power restriction, the display may be executed by displaying different colors or lighting patterns of LED. The same effect can be achieved by notifying the user by using a sound or vibration different from those used in the case without power restriction.

In this embodiment, the WPC power transmission apparatus is activated after it is determined whether to restrict the transmission power by the USB authentication. However, in a case in which transmission power restriction by the USB authentication has been determined after simultaneously activating the USB devices and the WPC apparatuses, asynchronously performing the USB authentication and the WPT authentication, and starting the power transmission between the WPC apparatuses, the same effect can be achieved by restricting the WPC power transmission by renegotiation. However, additional effects can be expected by activating the WPC power transmission apparatus after determining whether to restrict the transmission power in the USB authentication according to this embodiment. Since whether to restrict the transmission power is determined already in the USB authentication when the TX 100 is to determine the GP in the negotiation phase (411), the process of renegotiation need not be generated.

<Backward Compatibility with WPT Authentication Operation>

As greater power is transmitted by the WPC specification, a WPT authentication function needs to be added to a legacy WPC specification in order to avoid risks. In this case, a TX which has the WPT authentication function must ensure backward compatibility with not only an RX which also has the WPT authentication function but also with a legacy RX. Similarly, the RX which has the WPT authentication function must ensure backward compatibility with a legacy TX. However, a technique for adding a WPT authentication function in compliance with the legacy WPC specification while also considering backward compatibility has not been proposed.

Hence, in a case in which new device authentication is added to a standard specification of wireless power transmission, a mode of maintaining compatibility with the standard specification of a version which is not compliant with the new device authentication will be described hereinafter.

FIG. 7 is a flowchart showing the operation of the control unit 1101 of the TX 100 according to this embodiment. FIGS. 8A to 8B are sequence charts for explaining the backward compatibility by the TX 100 or the RX 200 in a version A. Although the WPT authentication according to this embodiment will be described as challenge-response device authentication using a digital certificate in the same manner as the USB authentication, the WPT authentication is not limited to this. The TX 100 operates as an initiator that transmits a challenge text to the RX 200, and the RX 200 operates as a responder that encrypts the challenge text and transmits the encrypted challenge text to the TX 100. FIGS. 9A to 9C are flowcharts showing the operation of the control unit 201 of the RX 200. FIG. 10A is a view showing an example of the bit arrangement of a configuration packet conforming to the WPC specification. FIG. 10B is a view showing an example of the bit arrangement of a power transmitter p compatibility packet conforming to the WPC specification. Note that the same reference symbols denote the same components throughout the drawings.

The categories for TX and RX based on the WPC specification v1.2.2 will be described before explanation of the sequence charts and flowcharts. A TX and a RX each with OP of 5 W are categorized under the Basic Power Profile (BPP). A TX and an RX each with GP which is higher than 5 W and not more than 15 W are categorized under the Extended Power Profile (EPP). In addition, in the WPC specification v1.2.2, a function to execute a negotiation between a TX and an RX in relation to the OP has been added. The TX and the RX, which are categorized under EPP, both have the negotiation function. The TX and the RX, which are categorized under BPP, are further categorized into an apparatus which supports the negotiation function and an apparatus which does not support the negotiation function. A TX can determine whether an RX has a negotiation function by a Neg bit (Bank4, bit7) in the configuration packet (FIG. 10A) in which the setting information of the RX is described, if the Neg bit is "1", the RX has a negotiation function. If the Neg bit is "0", the RX does not have a negotiation function. In this embodiment, unless otherwise specified, it will be assumed that a legacy TX and a legacy RX each have a negotiation function, and that the negotiation is executed in the negotiation phase.

A TX and an RX of the WPC specification version A in compliance with the WPT authentication must be backward compatible with each of the legacy RX and the legacy TX in compliance with the WPC specification v1.2.2. That is, a TX in compliance with the WPC specification version A needs to operate without contradiction with respect to an RX which is in compliance with a WPC specification of an earlier version than the version A. In the same manner, a RX in compliance with the WPC specification version A needs to operate without contradiction with respect to a TX which is in compliance with a WPC specification of an earlier version than the version A.

Hence, the backward compatibility of the TX 100 and the RX 200 which are in compliance with the version A shown in this embodiment with the WPC specification v1.2.2 will be described with reference to FIGS. 7, 8A to 8B, and 9A to 9C. The TX and the RX in compliance with the legacy EPP of the WPC specification v1.2.2 undergo a state transition in the order of the selection phase, the ping phase, the I & C phase, the negotiation phase, the calibration phase, and the PT phase. In a case in which at least one of the legacy TX and the legacy RX is a BPP device which does not have a negotiation function, the TX and the RX undergo a state transition in the order of the selection phase, the ping phase, the I & C phase, and the PT phase.

As described above, if both the TX and the RX are in compliance with the authentication phase, the TX and the RX transit in the order of the selection phase, the ping phase, the I & C phase, the authentication phase, the negotiation phase, the calibration phase, and the PT phase. Here, the authentication phase is to be executed before the negotiation phase. The reason is as follows. FIG. 6 described how the value of the GP changes in accordance with the WPT authentication result. Consider a case in which the transition to the authentication phase is executed after the OP has been determined by the negotiation between the TX and the RX in the negotiation phase. In this case, in order to avoid the above-described risks due to the result of the authentication phase, it is possible that the already determined GP may be changed again. Such re-changing of the GP is problematic in that it complicates the order of the transition to the PT phase, thereby taking more time. By executing the authentication phase before the negotiation phase, the GP can be restricted in the authentication phase, and the OP can be determined in the negotiation phase under the premise of the restricted GP. In this manner, by restricting the GP in the authentication phase before the negotiation phase, the re-changing of the GP does not occur in the transition to the PT phase, and the transition to the PT phase can be executed quickly.

<Case in Which Both TX 100 and RX 200 Are Legacy TX and Legacy RX, Respectively>

First, FIG. 8A which is a sequence chart of the WPC specification v1.2.2 in a case when both the TX 100 and the RX 200 are apparatuses in compliance with a legacy EPP will be described. Note that in the following explanation, assume that the USB authentication operations of the USB cable 300 and the AC adapter 301 by the TX 100 have been successful. Only the parts related to the legacy EPP are used in the flowcharts of FIGS. 7 and 9A. That is, the processes of steps S703 to S708 in FIG. 7 are not present in the legacy TX, and the processes of steps S903 to S905 and S908 in FIG. 9A are not present in the legacy RX. Note that only the sequence of the I & C phase and the sequences of the subsequent phases related to backward compatibility are shown in FIG. 8A.

After the processes of the selection phase and the ping phase have been performed between the TX 100 and the RX 200, the state transits to the I & C phase (step S701). In the I & C phase, the RX 200 transmits an identification packet (ID packet) to the TX 100 (800, step S901). The ID packet stores, other than the individual identification information of itself, an information element identifying the supported WPC specification version (v1.2.2 in this case). Next, the RX 200 transmits a configuration packet to the TX 100 (801, step S901). The configuration packet of the WPC specification v1.2.2 includes a maximum power value which is the specific value of maximum power the RX 200 can supply to the load and a Neg bit which is a bit indicating whether there is a negotiation function. Here, the RX 200 sets "1" in the Neg bit and indicates that it has a negotiation function.

Upon receiving the ID packet and the configuration packet from the RX 200 (step S702), the TX 100 determines whether the RX 200 has a negotiation function (step S704). Since the RX 200 has a negotiation function (YES in step S704), the TX 100 transmits an ACK to the configuration packet (step S713, 802) and transits to the negotiation phase (step S709). Note that in a case in which the RX 200 is a BPP (Neg bit is 0) not supporting the negotiation function, the TX 100 will transit to the PT phase (step S712) without transmitting the ACK. Similarly, in a case in which the TX 100 itself is BPP and does not support the negotiation function, the TX 100 will transit to the PT phase without transmitting the ACK. In this case, the GP is restricted to 5 W.

The reception of the ACK (YES in step S902) allows the RX 200 to know that the TX 100 supports the negotiation function, and the RX 200 transits to the negotiation phase (step S906). The RX 200 then transmits a specific request packet to request power (for example, 15 W) necessary for the self-apparatus. In this case, the RX 200 transmits, as the information element of the specific request packet, a specific request (15 W) indicating a request for 15 W for OP to the TX 100 (803). Here, after transmitting the configuration packet, the RX 200 of the WPC specification v1.2.2 will determine (step S909) that the TX 100 is a BPP without a negotiation function if the RX 200 does not receive (NO in step S902) an ACK within 15 ms. Subsequently, the RX 200 transits to the PT phase (step S910).

Upon receiving the specific request (15 W), the TX 100 compares its own transmission power with the 15 W. If power transmission is possible, the TX transmits an ACK representing a positive acknowledgement to the RX 200. Otherwise, the TX transmits a NAK indicating the rejection of the request to the RX. Here, the TX determines (step S710) the GP of 15 W by determining that power of 15 W can be transmitted and transmits (804) an ACK. The TX 100 transits to the calibration phase. Upon receiving the ACK from the TX 100 to the specific request (803), the RX 200 transits to the calibration phase (step S907). In the calibration phase, the TX 100 performs adjustment based on the correlation between the value of the transmission power from the TX 100 to the RX 200 measured in the TX 100 and the value of the received power measured in the RX 200. After the completion of the calibration phase, the TX 100 and the RX 200 transit to the PT phase and start the wireless power transmission (steps S712 and S910).

As described above, the TX 100 of the WPC specification v1.2.2 determines whether the RX 200 is an EPP and a BPP which has a negotiation function or a BPP which does not have a negotiation function based on the Neg bit. In the former case, the TX transits to the negotiation phase. In the latter case, the TX transits to the PT phase.

In addition, by a determination based on whether an ACK is received as a response within 15 ms from the transmission of the configuration packet, the RX 200 of the WPC specification v1.2.2 transits to the negotiation phase if the ACK is received. Otherwise, the RX transits to the PT phase.

By the above-described operation, in the WPC specification v1.2.2, the compatibility is ensured between the TX 1.00 and the RX 200 that have negotiation functions and the TX 100 and the RX 200 that do not have the negotiation functions.

<Case in Which TX 100 Is Version A and RX 200 Is Legacy RX>

A case in which the TX 100 is in compliance with the version A and the RX 200 is a legacy RX will be described with reference to FIGS. 8B, 6, 7, and 9A. Note that in the following explanation, assume that the USB authentication operations of the USB cable 300 and the AC adapter 301 by the TX 100 have been successful. Since the entire following description is a description related to the backward compatibility of the WPC specification, it is obvious that the description is applicable even in an arrangement in which the TX 100 does not include the first authentication unit.

First, an Auth bit in the configuration packet will be defined. FIG. 10A shows the arrangement of a configuration packet according to the WPC specification v1.2.2. Note that explanation of parts unrelated to the present invention will be omitted. The configuration packet includes a plurality of reserved areas, for example, a reserved area 1001 from bit4 to bit6 in Bank2, a reserved area 1000 from bit0 to bit7 in Bank1, and a reserved area 1002 from bit2 to bit 0 in Bank4. In this embodiment, the Auth bit is arranged in the bit6 of Bank2. However, the arrangement of the Auth bit is not limited to this, and it may be arranged in other reserved areas. Note that each bit in a reserved area is 0 in the WPC specification v1.2.2. If the RX 200 itself supports the WPT authentication, the RX stores "1" in the Auth bit. Otherwise, "0" is stored in the Auth bit.

The TX 100 determines whether the RX 200 supports the WPT authentication by the Auth bit in the configuration packet (step S703). Since the RX 200 is a legacy RX, the Auth bit is "0". The TX 100 determines that the RX 200 does not support the WPT authentication (NO in step S703) and transits to the negotiation phase. Here, if the TX receives a request for a GP of 15 W from the RX 200, the TX transmits an NAK indicating the rejection of the request to the RX 200 (805). As described in FIG. 6, this is because the RX 200 does not support the WPT authentication, and thus the TX 100 determines that a power of 15 W should not be transmitted in order to avoid risks.

When its request is rejected by a NAK, the RX 200 transmits a general request defined by the WPC specification v1.2.2 to know the GP value settable by the TX 100. Here, among general requests, a message requesting a transmitter capability packet will be represented as a general request (capability) in this embodiment. A transmitter capability packet includes a settable GP value and is a packet defined by the WPC specification v1.2.2.

Upon receiving the general request (capability) (806), the TX 100 determines 5 W of GP in correspondence with a state of WPT authentication non-support (row 603) and a state of USB authentication success (column 602) based on the above-described FIG. 6. The TX 100 stores the information indicating 5 W in the guaranteed power value of the power transmitter capability packet and transmits the packet to the RX 200 (807).

As described above, by using the Auth bit defined in this embodiment, the TX 100 in compliance with the WPC specification version A can operate without contradiction with respect to the legacy RX in compliance with the WPC specification of an earlier version than the version A.

<Case in Which TX 100 and RX 200 Both Comply with Version A>

Next, a case in which both the TX 100 and the RX 200 are in compliance with the WPT authentication processing will be described with reference to FIGS. 6, 7, 8E, and 9A. Note that in the following explanation, assume that the USB authentication operations of the USB cable 300 and the AC adapter 301 by the TX 100 have been successful. The operations of the TX 100 and the RX 200 of the version A complying with the WPT authentication will be described before the explanation.

The RX 200 of the version A transmits, to the TX 100, a configuration packet in which "1" is stored in the Auth bit. Based on the Auth bit of the configuration packet, the TX 100 of the version A determines that the RX 200 supports the WPT authentication (YES in step S703) and transmits an ACK(auth) to the RX 200 (step S705, S02). An ACK(auth) is an acknowledgement that can be distinguished from an ACK, is configured from a bit pattern different from the ACK, and is a packet indicating the acknowledgement of the configuration packet and that the TX 100 supports the WPT authentication.

Upon determining that the RX 200 supports the WPT authentication in this manner, the TX 100 transmits an ACK(auth) and transits to the authentication phase (step S706). On the other hand, upon receiving the ACK(auth) (YES in step S903), the RX 200 determines that the TX 100 supports the WPT authentication (step S904) and transits to the authentication phase (S905).

Processes 814 to 820 in FIG. 8E show an example of the WPT authentication according to this embodiment. First, the TX 100 transmits a GET_DIGEST message to the RX 200 (814, S707). A GET_DIGEST packet is a packet requesting the information related to a digital certificate held by the RX 200. The RX 200 transmits a DIGEST in response to the GET_DIGEST packet (815). A DIGEST is information related to the digital certificate possessed by the RX 200. Next, the TX 100 transmits a GET_CERTIFICATE packet requesting the detailed information related to the digital certificate to the RX 200 (816). The RX 200 transmits a CERTIFICATE in response to the GET_CERTIFICATE packet (817).

Next, the TX 100 transmits a CHALLENGE message including a challenge text to the RX (818), and the RX 200 transmits a RESPONSE in which the challenge text has been encrypted to the TX 100 (819). After confirming the validity of the RESPONSE, the TX 100 transmits RESULT(success) to the RX (820, step S708) and transits to the negotiation phase (step S709). A RESULT(success) packet indicates a RESPONSE result that WPT authentication has been successful. Upon receiving the RESULT(success), the RX 200 transits to the negotiation phase (step S906).

In the negotiation phase, the TX 100 executes a negotiation operation by determining GP of 15 W corresponding to the state of WPT authentication success (row 605) and the state of the USB authentication success (column 602) based on the above-described FIG. 6. Upon receiving a request for GP of 15 W from the RX 200 (803), the TX 100 itself refers to FIG. 6 to set the GP value of 15 W for the negotiation. Hence, the TX transmits an ACK acknowledging the request to the RX 200 (804). If authentication fails as a result of RESPONSE, the TX 100 transmits RESULT(fail), indicating a failure, instead of the RESULT(success) to the RX 200. The TX then determines the GP value in the subsequent negotiation phase based on FIG. 6. Alternatively, the TX 100 can stop the power transmission unit 103 after transmitting the RESULT(fail).

As described above, the TX 100 according to this embodiment can operate not only with respect to an RX in compliance with a WPC specification of an earlier version than the version A but also with respect to an RX in compliance with the version A without contradiction.

Here, a supplementary explanation will be given about the time interval between packets from the GET_DIGEST (814) to the RESULT(success) (820). In, for example, the negotiation phase of the WPC specification v1.2.2., the response from the TX 100 to the packet of the RX 200 is required to be within 10 ms from the trailing edge of the packet of the RX 200 to the leading edge of the response packet of the TX 100. However, an initiator (TX 100) in the authentication phase requires encryption/decryption processing to confirm the validity of each packet (DIGEST, CERTIFICATE, and RESPONSE) which are related to the digital certificate and are transmitted by the RX 200. Hence, a response requires time in the authentication phase. Therefore, in the authentication phase, a long response time is set compared to the response times of other phases. In this embodiment, the response time is set to 50 ms. That is, in FIG. 8E, the response time is the time from DIGEST to GET_CERTIFICATE, the time from the CERTIFICATE to CHALLENGE, and the time from RESPONSE to RESULT(success). Prolonging the response time has the effect of decreasing the need for the control unit 101 of the TX 100 to operate at a high speed and implementing cost reduction by reducing the power consumption of the control unit 101 and using a lower speed CPU.

Note that although the TX 100 determined whether the power receiving apparatus supports the WPT authentication by the Auth bit of the configuration packet, this may be determined by the version information in the ID packet. The same effect can be achieved if the TX determines that the power receiving apparatus supports the WPT authentication when the version information indicates the version A (or any subsequent version) or if the TX determines that the power receiving apparatus does not support the WPT authentication when the version information indicates an earlier version than the version A.

<Case 1 in which TX is Legacy TX and RX is Version A>

A case in which the TX 100 is a legacy TX and the RX 200 is in compliance with the version A will be described with reference to FIGS. 8C, 6, and 9A. Note that in the following explanation, assume that the USB authentication operations of the USB cable 300 and the AC adapter 301 by the TX 100 have been successful. The operation of the RX 200 in compliance with the version A will be described first.

The RX 200 notifies the TX 100 by transmitting a configuration packet that it supports the WPT authentication (800, 801). However, since the TX 100 is a legacy TX, it will ignore the Auth bit. Since the RX 200 is in compliance with the negotiation function, the TX 100 transmits and ACK and transits to the negotiation phase (YES in step S704, step S713, and step S709).

Upon receiving the ACK (802, YES in step S902), the RX 200 determines that the TX 100 does not support the WPT authentication and is a legacy TX (step S908). This is because, since the RX itself supports the WPT authentication, an ACK(auth) should have been received if the TX 100 also supports the WPT authentication. Note that if the RX 200 does not receive the ACK within 15 ms from the transmission of the configuration packet (NO in step S902) and also does not receive the ACK(auth) (NO in step S903), the process advances to step S909. In this case, the RX 200 determines that the TX 100 is a BPP and does not support the negotiation function (step S909), and transits to the PT phase (step S910).

The RX 200 executes GP negotiation in the negotiation phase, but the RX 200 determines that power of 15 W should not be received to avoid the above-described risks as described in FIG. 6. The RX 200 determines GP of 5 W corresponding to the state of WPT authentication non-support (row 603) and the state of the USB authentication success (column 602) as the GP for the negotiation and transmits a specific request (5 W) (809). The RX 200 receives an ACK from the TX 100 (810) and ends the negotiation phase. The RX 200 transits (step S907) to the calibration phase and transits (step S910) to the PT phase after executing predetermined processing.

As described above, the RX 200 in compliance with the WPC specification version A can operate without contradiction with respect to the TX 100 in compliance with the WPC specification of an earlier version than the version A. Furthermore, as described in FIG. 8E, the RX 200 can operate without contradiction even in a case in which the TX 100 supports the WPT authentication.

<Case 2 in which TX is Legacy TX and RX is Version A>

In the above-description, in a case in which the RX 200 is in compliance with the version A, whether the TX 100 supports the WPT authentication and whether the TX is in compliance with the negotiation function were determined based on the response to the configuration packet from the TX 100. More specifically, an example in which the above-described determination is made based on whether an ACK or an ACK(auth) is received within 15 ms from the transmission of the configuration or based on whether both have not been received has been described. Here, another example of determining whether the TX. 100 is in compliance with the version A will be described with reference to FIGS. 8D and 9C. Note that in the following explanation, assume that the USB authentication operations of the USB cable 300 and the AC adapter 301 by the TX 100 have been successful.

Upon receiving an ACK in response to the configuration packet, the RX. 200 transmits an Auth Req to request the execution of the WPT authentication (step S912, 810). The Auth Req is an authentication request packet to request the TX 100 to transit to the authentication phase and is a reserved packet whose packet type is not defined in the WPC specification v1.2.2. In this embodiment, the packet header in the reserved packet defines the 0x40 packet as an Auth Req packet. After returning the ACK to the configuration packet, the TX in compliance with the version A transits to the authentication phase in response to the reception of the Auth Reg packet and starts the WPT authentication.

On the other hand, a TX which is not in compliance with the version A operates as follows. In the WPC specification v1.2.2, it is stipulated that the TX will transmit a not-defined response (ND Resp) packet when the TX 100 sees the packet type in the negotiation phase and determines the reception of an unsupported packet. However, it is stipulated that the TX 100 will not transmit a response even if an unsupported packet is received in the I & C phase. The TX 100 is set to the negotiation phase since it has transmitted the ACK (802) to the configuration packet. Hence, the TX 100 which is a legacy TX transmits an ND Resp to the RX 200 in response to the Auth Req packet (811). Upon receiving the ND Resp (YES in step S913), the RX 200 determines that the TX 100 does not support the WPT authentication (S908) and transits to the negotiation phase without executing the WPT authentication (step S906).

Here, if the RX 200 does not receive the ND Resp in response to the Auth Req (NO in step S913) but received an ACK (YES in step S914), the process advances to step S904. In this case, the RX 200 determines that the TX 100 supports the WPT authentication (step S904), and the RX transits to the authentication phase (step S905). Note that if the RX 200 does not receive the ND Resp or the ACK in response to the Auth Req (NO in step S914), the RX 200 transmits, to the TX 100, a power transmission stop request and returns to the selection phase (step S915). The power transmission stop request executed by transmitting, for example, an end of transmission packet (ETP). By transmitting a power transmission stop request to the TX 100, an effect in which the system can be returned to the original state can be achieved when the WPC sequence cannot be continued due to the breakdown of the TX 100 or the degradation of communication quality between the TX 100 and the RX 200.

In addition, in a case in which the RX 200 does not receive the ND Resp or the ACK, the RX 200 may retransmit the Auth Req. This is because the TX 100 may not have been able to correctly receive the. Auth Req. Also, in the WPC specification v1.2.2, it is stipulated that the TX 100 will remain in the negotiation phase when the TX 100 cannot correctly receive a packet in the negotiation phase. Hence, by retransmitting the Auth Req, there is a possibility that the sequence may be continued if the TX 100 correctly receives the packet and the RX receives the ACK or the NI) Resp. It may be set so that an EPT is transmitted when neither an ACK nor an ND Resp is received after the Auth Req has been transmitted several times (about 3 times) continuously.

As described above, in a negotiation phase in which the TX 100 is to return a response (ND Resp) to a packet which it does not support, the RX 200 transmits a packet to determine whether the TX 100 supports the WPT authentication. Hence, the RX 200 can determine whether the WPT authentication is supported by the TX 100 depending on the response to the Auth Req and can operate without contradiction with respect to a TX which does not support the WPT authentication.

The Auth Req suffices to be a packet that can expect a response (ND Resp) from the legacy TX 100. Hence, among the packets that can expect a response and is under the WPC specification v1.2.2, it may be a reserved packet whose packet type has not been defined. For example, a general request packet and a specific request packet are packets that can expect a response. More specifically, it may be a specific request packet whose packet request field is reserved (0x05 to 0xEF), in this case, if the TX 100 does not support the WPT authentication, the TX 100 transmits an NI) Resp, and the RX 200 receives this ND Resp. Alternatively, it may be a general request packet whose request field is reserved. In this case, if the TX 100 does not support the WPT authentication, the TX 100 transmits, in the same manner as the ND Resp, a power transmitter data not available packet indicating its lack of support as a response to the request, and the RX 200 receives this packet.

Alternatively, the RX may exchange packets for determining whether the WPT authentication is supported with the TX before transmitting the Auth Req. For example, the RX 200 may transmit a general request packet to request a power transmitter identification packet which includes the individual identification information and the specification version of the TX 100. In this case, the RX 200 acquires the specification version of the TX 100 by the general request before the transmission of the Auth Req. The RX 200 can transmit the Auth Req by determining that the WPT authentication is supported by the TX 100 if the acquired version information is version A or later. Otherwise, the RX can determine that the TX 100 does not support the WPT authentication.

Also, the power transmitter identification packet request may be executed by transmitting the same general request packet to make a request for the power transmitter capability packet in which the capability information of the TX 100 is stored. The power transmitter capability packet is a packet transmitted by the TX 100, which is the power transmission apparatus, to notify the power receiving apparatus of its power transmission capability, and the information indicating the capability of the execution of the WPT authentication can be included in this packet. In this case, either the bit7 or the bit6 of Bank1 or one of bits from bit7 to bit2 of Bank2 reserved in the power transmitter capability packet (FIG. 10B) in the WPC specification v1.2.2 can be defined as the Auth bit by the version A. "1 (WPT authentication support)" or "0 (WPT authentication non-support)" is written in the Auth bit. The TX 100 which is in compliance with the version A will write "1 (WPT authentication support)" in the Auth bit of the power transmitter capability packet.

Furthermore, in order to receive a response to the reserved packet, the RX 200 will transmit a reserved packet when the TX 100 is in the negotiation phase. This allows the RX to determine whether the TX 100 is a legacy TX and whether the TX supports the WPT authentication by determining whether the response is an ND Resp or an ACK. Since the TX 100 does not respond to the reserved packet in the WPC specification v1.2.2 even if the same packet is transmitted in the I & C phase, the above-described determination cannot be performed.

<Case 3 in which TX is Legacy TX and RX is Version A>

An example in which the RX 200 determines whether the TX 100 supports the WPT authentication based on the response to the ACK(auth) or Auth Req has been described. Another example will be described with reference to FIG. 9B hereinafter. Note that in the following explanation, assume that the USB authentication operations of the USB cable 300 and the AC adapter 301 by the TX 100 have been successful. After receiving the ACK in response to the configuration packet and shifting to the negotiation phase, the RX 200 determines whether a specific packet which is transmitted from the TX 100 has been received during a predetermined time in the authentication phase. If the specific packet is received within the predetermined time, the RX 200 determines that the TX 100 supports the WPT authentication. Otherwise, the RX determines that the TX 100 does not support the WPT authentication.

The operation of the TX 100 which supports the WPT authentication will be described before the following explanation. Upon determining from the configuration packet that the RX 200 supports the WPT authentication, the TX 100 transits to the authentication phase. That is, the TX 100 transmits, to the RX 200, the beginning of the GET_DIGEST packet within a predetermined time from the trailing edge of the ACK to the configuration packet.

In a case in which the TX 100 is a legacy TX, since the RX 200 does not receive the beginning of the GET_DIGEST packet within a predetermined time (NO in step S911), the RX determines that the TX 100 does not support the WPT authentication (step S908) and transits to the negotiation phase. In this manner, the RX 200 operates without contradiction with respect to the legacy TX 100. If the WPT authentication is supported by the TX 100, the RX 200 receives at least the beginning of the GET_DIGEST packet within a predetermined time (YES in step S911). Thus, the RX 200 determines that the TX 100 supports the WPT authentication (step S904) and transits to the authentication phase (step S905).

Here, assume that the above-described predetermined time is 6 ms in this embodiment. In the WPC specification v1.2.2, it is stipulated that the RX 200 cannot transmit the beginning of any kind of a packet for 6 ms after the reception of an ACK. Therefore, if the TX 100 transmits the beginning of the GET_DIGEST packet at least within 6 ms, it is possible to cause the RX 200 to transit to the authentication phase before the RX 200 transmits a packet (for example, a specific request or the like) which is to be transmitted in the negotiation phase.

As described above, the RX 200 according to this embodiment can operate without contradiction when the TX 100 is a legacy TX and supports the WPT authentication.

<Case in which the RX is Initiator of WPT Authentication>

FIG. 8E describes an example in which the TX 100 is the initiator. However, the present invention is not limited to this, and the RX 200 may be the initiator. In this case, since the RX 200 determines that the TX 100 supports the WPT authentication by receiving the ACK(auth), the RX transits to the authentication phase. The RX 200 then transmits a GET_DIGEST packet to the TX 100. The transmission of the GET_DIGEST packet and the subsequent authentication processing (from 814 to 820) are executed in the reverse direction of the corresponding packet arrows shown in FIG. 8E. The RX 200 transits to the negotiation phase upon transmitting the RESULT(success). In the same manner, the TX 100 transits to the negotiation phase upon receiving the RESULT(success). The same effect can be clearly achieved even when the processes are implemented in the above described manner.

In a case in which the TX 100 receives a packet other than the predetermined packets from the RX 200 in the authentication phase, the TX may stop the power transmission by the power transmission unit 103 and transit to the selection phase. The predetermined packets refer to the packets of 814 to 820 and are GET_DIGEST, DIGEST, GET_CERTIFICATE, CERTIFICATE, CHALLENGE, RESPONSE, and RESULT. If a packet such as the signal strength packet indicating the voltage value of the received voltage, a control error packet requesting the voltage value to be increased decreased, an ID packet, a configuration packet, or the like is received in the authentication phase, the TX 100 stops the power transmission and returns to the selection phase. In this manner, the TX 100 can prevent an unexpected operation in the system by stopping the power transmission when a packet other than the predetermined packets is received due to the breakdown of the RX 200 or the like in the authentication phase.

As described above, in the contactless charging system according to this embodiment, device authentication using a USB protocol is performed between a power supply apparatus (AC adapter 301) which is the power supply source and a power transmission apparatus, and device authentication using a WPT protocol is performed between the power transmission apparatus and a power receiving apparatus. Subsequently, the transmission power of the WPC power transmission apparatus is controlled based on the USB device authentication result and the WPT device authentication result. This arrangement can implement preferable power transmission apparatus control without the risk of overheating of devices present in a power supply path.

In addition, the transmission power of the WPC power transmission apparatus is restricted based on the USB authentication result before the start of the power transmission from the WPC power transmission apparatus to the power receiving apparatus. This arrangement can implement high-speed control since the renegotiation of transmission power due to the restriction of the transmission power based on the USB authentication result will not occur after the start of power transmission by the WPC power transmission apparatus.

Other Embodiments

The power transmission method of the wireless power transmission system according to the present invention is not particularly limited. A magnetic resonance method in which power is transmitted by magnetic resonant coupling between a resonator (resonant element) of the TX and a resonator (resonant element) of the RX may be employed. Alternatively, a power transmission method using an electromagnetic induction method, an electrical resonance method, a microwave method, a laser, or the like may be employed.

The TX and the RX each may be, for example, an image input apparatus such as a scanner or an image capturing apparatus (a camera, a video camera, or the like) or an image output apparatus such as a printer, a copy machine, or a projector. A storage device such as a hard disk device or a memory device may be used as the TX or the RX, or an information processing apparatus such as a personal computer (PC) or a smartphone may be used as the TX or the RX.

In addition, each of the flowcharts shown in FIGS. 5, 7, and 9A to 9C is started when the control unit is powered on. Note that each of the processing operations shown in FIGS. 5 and 7 is implemented by the control unit 101 executing a program stored in the memory 107 of the TX 100. The each of the flowcharts shown in FIGS. 9A to 9C is executed by the control unit 201 executing a program stored in the memory 209 of the RX 200.

Note that at least some of the processes shown in the flowcharts of FIGS. 5, 7, and 9A to 9C may be implemented by hardware. If the processes are to be implemented by hardware, for example, a predetermined compiler can be used to automatically generate a dedicated circuit on an FPGA from a program for implementing each step. An FPGA is an acronym for field programmable gate array. Furthermore, some of the processes may be implemented by forming a gate array circuit as hardware in the same manner as the FPGA.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-163671, filed Aug. 28, 2017, which is hereby incorporated by reference herein in its entirety.

The invention claimed is:

1. A power transmission apparatus that transmits power wirelessly to a power receiving apparatus by using power supplied from a power supply apparatus, comprising:
   a first authentication unit configured to execute device authentication with the power supply apparatus;
   a second authentication unit configured to execute device authentication with the power receiving apparatus; and
   a negotiation unit configured to perform negotiation related to transmission power with the power receiving apparatus based on a result of the device authentication by the first authentication unit and a result of the device authentication by the second authentication unit.

2. The apparatus according to claim 1, further comprising: a confirmation unit configured to confirm that the power receiving apparatus supports the device authentication by the second authentication unit.

3. The apparatus according to claim 1, wherein the second authentication unit responds to an authentication request requesting the execution of device authentication from the power receiving apparatus and starts the device authentication.

4. The apparatus according to claim 1, wherein information indicating the presence of a device authentication capability of the second authentication unit is included in a packet which is to be transmitted to notify the power receiving apparatus of a power transmission capability.

5. The apparatus according to claim 1, wherein in a case in which the device authentication by the first authentication unit is unsuccessful, transmission power set as a result of the negotiation unit is comparatively smaller than transmission power set as a result of the negotiation unit in a case in which the device authentication by the first authentication unit is successful.

6. The apparatus according to claim 1, wherein in a case in which the device authentication by the first authentication unit and the device authentication by the second authentication unit are successful, the negotiation unit determines the transmission power based on the maximum capability of the power transmission apparatus and the power receiving apparatus.

7. The apparatus according to claim 1, wherein in a case in which an authentication subject device does not support the device authentication by the first authentication unit or the device authentication by the second authentication unit, the transmission power is set comparatively smaller than the transmission power in a case in which the device authentication by the first authentication unit and the device authentication by the second authentication unit are successful.

8. The apparatus according to claim 1, wherein as a result of the device authentication by the first authentication unit or the device authentication by the second authentication unit, if it is determined that authentication has failed although authentication is supported in at least one authentication target device, power transmission to the power receiving apparatus is stopped.

9. The apparatus according to claim 1, wherein the device authentication by the first authentication unit is executed before the device authentication by the second authentication unit.

10. The apparatus according to claim 1, further comprising:
a notification means for unit configured to notify the power receiving apparatus of the result of the device authentication by the first authentication unit and the result of the device authentication by the second authentication unit.

11. The apparatus according to claim 1, further comprising:
an informing unit configured to inform a user of the result of the negotiation unit and one of the result of the device authentication by the first authentication unit and the result of the device authentication by the second authentication unit which is related to reduction in transmission power by the negotiation unit.

12. The apparatus according to claim 1, wherein the second authentication unit executes the device authentication by executing communication using a coil for transmitting power wirelessly to the power receiving unit.

13. The apparatus according to claim 1, wherein the negotiation unit determines transmission power to be permitted based on the result of the device authentication by the first authentication unit and the result of the device authentication by the second authentication unit, and negotiates so that transmission power to the power receiving apparatus will be not more than the determined transmission power.

14. The apparatus according to claim 1, wherein the power supply apparatus is one of an adapter and a cable for supplying power, and
the first authentication unit executes device authentication on one of the adapter and the cable.

15. The apparatus according to claim 1, wherein a communication protocol to be used in the device authentication by the first authentication unit is different from a communication protocol to be used in the device authentication by the second authentication unit.

16. The apparatus according to claim 1, wherein the second authentication unit executes the device authentication on the power receiving apparatus based on a digital certificate held by the power receiving apparatus.

17. A power receiving apparatus that receives power wirelessly transmitted from a power transmission apparatus, comprising:
an authentication unit configured to execute device authentication with the power transmission apparatus;
a notification unit configured to notify the power transmission apparatus that the power receiving apparatus has a function for executing a device authentication to the power transmission apparatus;
a determination unit configured to determine, based on a response from the power transmission apparatus to the notification by the notification unit, whether the power transmission apparatus supports the device authentication;
an execution unit configured to execute the device authentication by the authentication unit if it is determined by the determination unit that the power transmission apparatus supports the device authentication; and
power receiving unit configured to receive power transmitted from the power transmission apparatus for supplying power corresponding to one of a result of the determination by the determination unit and a result of the device authentication by the execution unit.

18. The apparatus according to claim 17, wherein the notification unit includes information indicating the presence of the device authentication capability in a predetermined packet.

19. The apparatus according to claim 18, wherein when a signal indicating the presence of the device authentication capability is received from the power transmission apparatus in response to the predetermined packet, the determination unit determines that the power transmission apparatus supports the device authentication.

20. The apparatus according to claim 18, wherein when the device authentication with the power transmission apparatus is started within a predetermined time after the reception of a response to the predetermined packet, the determination unit determines that the power transmission apparatus supports the device authentication.

21. The apparatus according to claim 17, wherein the notification unit transmits a device authentication requesting packet to the power transmission apparatus, and
the determination unit determines whether the power transmission apparatus supports the device authentication based on a response to the device authentication requesting packet from the power transmission apparatus.

22. A wireless power transmission system comprising:
a power supply apparatus;
a power transmission apparatus configured to transmit power wirelessly by using power supplied from the power supply apparatus;
a power receiving apparatus configured to receive power wirelessly transmitted from the power transmission apparatus;
a first authentication unit configured to cause the power transmission apparatus to execute device authentication with the power supply apparatus;
a second authentication unit configured to cause the power transmission apparatus to execute device authentication with the power receiving apparatus; and
a negotiation unit configured to cause the power transmission apparatus and the power receiving apparatus to perform negotiation related to transmission power based on a result of the device authentication by the first authentication unit and a result of the device authentication by the second authentication unit.

23. A method of controlling a power transmission apparatus that transmits power wirelessly to a power receiving apparatus by using power supplied from a power supply apparatus, the method comprising:
executing device authentication with the power supply apparatus;
executing device authentication with the power receiving apparatus; and
performing negotiation related to transmission power with the power receiving apparatus based on a result obtained in the executing the device authentication with the power supply apparatus and a result obtained in the executing the device authentication with the power receiving apparatus.

24. A method of controlling a power receiving apparatus that receives power transmitted wirelessly from a power transmission apparatus, the method comprising:
executing device authentication with the power transmission apparatus; notifying the power transmission apparatus that the power receiving apparatus has a function for executing a device authentication to the power transmission apparatus;
determining, based on a response from the power transmission apparatus to a notification in the notifying, whether the power transmission apparatus supports the device authentication; and
executing device authentication in the executing if it is determined in the determining that the power transmission apparatus supports the device authentication.

25. A method of controlling a wireless power transmission system comprising:
a power supply apparatus,
a power transmission apparatus configured to transmit power wirelessly by using power supplied from the power supply apparatus, and
a power receiving apparatus configured to receive power wirelessly transmitted from the power transmission apparatus,
the method comprising:
causing the power transmission apparatus to execute device authentication with the power supply apparatus,
causing the power transmission apparatus to execute device authentication with the power receiving apparatus, and
causing the power transmission apparatus and the power receiving apparatus to perform negotiation related to transmission power based on a result obtained in the causing the power transmission apparatus to execute the device authentication with the power supply apparatus and a result obtained in the causing the power transmission apparatus to execute the device authentication with the power receiving apparatus.

26. A non-transitory computer-readable storage medium storing a computer program for causing a computer to perform a method of controlling a power transmission apparatus that transmits power wirelessly to a power receiving apparatus by using power supplied from a power supply apparatus, the method comprising:
executing device authentication with the power supply apparatus;
executing device authentication with the power receiving apparatus; and
performing negotiation related to transmission power with the power receiving apparatus based on a result obtained in the executing the device authentication with the power supply apparatus and a result obtained in the executing the device authentication with the power receiving apparatus.

27. A non-transitory computer-readable storage medium storing a program for causing a computer to perform a method of controlling a power receiving apparatus that receives power transmitted wirelessly from a power transmission apparatus, the method comprising:
executing device authentication with the power transmission apparatus;
notifying the power transmission apparatus that the power receiving apparatus has a function for executing a device authentication to the power transmission apparatus;
determining, based on a response from the power transmission apparatus to a notification in the notifying, whether the power transmission apparatus supports the device authentication; and
executing device authentication in the executing if it is determined in the determining that the power transmission apparatus supports the device authentication.

* * * * *